US011635011B2

United States Patent
Clerc et al.

(10) Patent No.: US 11,635,011 B2
(45) Date of Patent: Apr. 25, 2023

(54) CONTROLLER AND METHOD FOR CONTROLLING OPERATION OF AN AFTERTREATMENT SYSTEM BASED ON SHORT-TERM AND LONG-TERM CUMULATIVE DEGRADATION ESTIMATES

(71) Applicant: Cummins Emission Solutions Inc., Columbus, IN (US)

(72) Inventors: James C. Clerc, Columbus, IN (US); Bradley V. Jones, Columbus, IN (US); Marc Alexander Greca, Bargersville, IN (US); Santosh Kumar Ratan, Indianapolis, IN (US); Rohil Daya, Columbus, IN (US); Karthik Venkata Rama Krishna Dadi, Columbus, IN (US); Jinqian Gong, Columbus, IN (US); Bryon D. Staebler, Columbus, IN (US); Todd A. Corbet, Franklin, IN (US); Alain Ngoy Tschimwang, Indianapolis, IN (US); Premjee Sasidharan, Columbus, IN (US); David C. Hall, Columbus, IN (US)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

(21) Appl. No.: 17/941,337

(22) Filed: Sep. 9, 2022

(65) Prior Publication Data

US 2023/0003152 A1 Jan. 5, 2023

Related U.S. Application Data

(63) Continuation of application No. PCT/US2021/020475, filed on Mar. 2, 2021.

(Continued)

(51) Int. Cl.
*F01N 3/20* (2006.01)
*F01N 3/10* (2006.01)
(Continued)

(52) U.S. Cl.
CPC .............. *F01N 3/208* (2013.01); *F01N 3/106* (2013.01); *F01N 3/0885* (2013.01); *F01N 9/007* (2013.01);
(Continued)

(58) Field of Classification Search
CPC combination set(s) only.
See application file for complete search history.

(56) References Cited

U.S. PATENT DOCUMENTS

| 8,726,723 B2 | 5/2014 | Clerc et al. |
| 2003/0046924 A1 | 3/2003 | Iihoshi et al. |

(Continued)

OTHER PUBLICATIONS

International Search Report and Written Opinion issued for PCT Application No. PCT/US2021/020475 issued May 19, 2021, 8 pages.

*Primary Examiner* — Binh Q Tran
(74) *Attorney, Agent, or Firm* — Foley & Lardner LLP

(57) ABSTRACT

A controller for controlling operation of an aftertreatment system that is configured to treat constituents of an exhaust gas produced by an engine, the aftertreatment system including a selective catalytic reduction (SCR) catalyst, the controller configured to: generate a short-term cumulative degradation estimate of the SCR catalyst corresponding to reversible degradation of the SCR catalyst due to sulfur and/or hydrocarbons based on a SCR catalyst temperature parameter; generate a long-term cumulative degradation estimate of the SCR catalyst corresponding to thermal aging of the SCR catalyst based on the SCR catalyst temperature parameter; generate a combined degradation estimate of the SCR catalyst based on the short-term cumulative degrada- (Continued)

tion estimate and the long-term cumulative degradation estimate; and adjust an amount of reductant and/or an amount of hydrocarbons inserted into the aftertreatment system based on the combined degradation estimate of the SCR catalyst.

22 Claims, 28 Drawing Sheets

Related U.S. Application Data

(60) Provisional application No. 62/988,755, filed on Mar. 12, 2020.

(51) Int. Cl.
  *F01N 11/00* (2006.01)
  *F01N 3/08* (2006.01)
  *F01N 9/00* (2006.01)

(52) U.S. Cl.
  CPC ......... *F01N 11/005* (2013.01); *F01N 2550/02* (2013.01); *F01N 2550/20* (2013.01); *F01N 2570/14* (2013.01); *F01N 2610/02* (2013.01); *F01N 2610/03* (2013.01); *F01N 2610/146* (2013.01); *F01N 2900/0601* (2013.01); *F01N 2900/1404* (2013.01); *F01N 2900/1602* (2013.01); *F01N 2900/1616* (2013.01); *F01N 2900/1618* (2013.01)

(56) References Cited

U.S. PATENT DOCUMENTS

| | | | |
|---|---|---|---|
| 2005/0091968 A1* | 5/2005 | van Nieuwstadt | F01N 3/0821 60/301 |
| 2006/0242945 A1 | 11/2006 | Wang et al. | |
| 2010/0024393 A1 | 2/2010 | Chi et al. | |
| 2010/0242440 A1 | 9/2010 | Garimella et al. | |
| 2015/0275733 A1* | 10/2015 | Matsumoto | F01N 3/2066 60/277 |
| 2016/0061085 A1 | 3/2016 | Nagaoka et al. | |
| 2016/0186628 A1* | 6/2016 | Saitoh | F01N 3/2066 60/276 |
| 2017/0167352 A1* | 6/2017 | Hagiwara | F01N 11/007 |
| 2018/0030911 A1* | 2/2018 | Nakada | F02D 41/0285 |
| 2018/0230876 A1* | 8/2018 | Nishijima | B01D 53/9495 |
| 2018/0252133 A1* | 9/2018 | Ogushi | B01D 53/9431 |
| 2019/0195107 A1* | 6/2019 | Shirasawa | F01N 3/208 |
| 2019/0271248 A1* | 9/2019 | Umemoto | B01D 53/9495 |

* cited by examiner

CONTROLLER AND METHOD FOR CONTROLLING OPERATION OF AN AFTERTREATMENT SYSTEM BASED ON SHORT-TERM AND LONG-TERM CUMULATIVE DEGRADATION ESTIMATES

CROSS-REFERENCE TO RELATED APPLICATIONS

The present application is a continuation based on PCT Application No. PCT/US2021/020475, which claims priority to and benefit of U.S. Provisional Application No. 62/988,755, filed Mar. 12, 2020. The contents of these applications are incorporated by reference in their entireties.

TECHNICAL FIELD

The present disclosure relates generally to aftertreatment systems for use with compression ignition internal combustion engines.

BACKGROUND

Many vehicles having compression ignition internal combustion engines include aftertreatment systems to reduce emissions of undesirable exhaust gas constituents such as nitrous or nitric oxide ($NO_x$), CO, hydrocarbons, etc. The aftertreatment systems include selective catalytic reduction (SCR) catalyst that experiences degradation and/or reduced efficiency over time. Efficiency reductions can affect the conversion capability of the SCR catalyst and ammonia storage capacity of the SCR catalyst. Degradation of the SCR catalyst can lead to reduction in catalytic conversion efficiency of the SCR catalyst leading to increased $NO_x$ emissions which is unacceptable. Therefore, knowledge of SCR catalyst degradation has been of much interest in this field. Furthermore, detection of SCR catalyst degradation can be complicated by the inclusion of multiple SCR catalysts with differing degradation modes and rates, and by other complications such as cross reading of multiple constituents by available composition sensors. Advanced emission control strategies therefore need to incorporate a model for such a behavior, which must also be sufficiently simple for practical implementation in vehicles.

SUMMARY

Embodiments described herein relate generally to systems and methods for predicting with a real-time engine-aftertreatment data and physics based cumulative damage model, degradation of SCR catalyst performance in terms of regulating or controlling exhaust emissions from a combustion engine in a vehicle.

In one embodiment, a controller is provided for controlling operation of an aftertreatment system configured to treat constituents of an exhaust gas produced by an engine, the aftertreatment system including a selective catalytic reduction (SCR) catalyst, the controller configured to: generate a short-term cumulative degradation estimate of the SCR catalyst corresponding to reversible degradation of the SCR catalyst due to sulfur and/or hydrocarbons based on a SCR catalyst temperature parameter; generate a long-term cumulative degradation estimate of the SCR catalyst corresponding to thermal aging of the SCR catalyst based on the SCR catalyst temperature parameter; generate a combined degradation estimate of the SCR catalyst based on the short-term cumulative degradation estimate and the long-term cumulative degradation estimate; and adjust an amount of reductant and/or an amount of hydrocarbons inserted into the aftertreatment system based on the combined degradation estimate.

In one aspect, the SCR catalyst temperature parameter comprises an inlet exhaust gas temperature at an inlet of the SCR catalyst, an outlet exhaust gas temperature at an outlet of the SCR catalyst, or a SCR catalyst temperature of the SCR catalyst.

In one aspect, the SCR catalyst temperature parameter is determined using a physical temperature sensor.

In one aspect, the SCR catalyst temperature is calculated based on operating parameters of the exhaust gas.

In one aspect, the controller is further configured to: modify stored ammonia slip data corresponding to ammonia slip through the SCR catalyst relative to a SCR catalyst temperature based on at least the combined degradation estimate, and adjust the amount of reductant and/or the amount of hydrocarbons inserted into the aftertreatment system based on the modified stored ammonia slip data.

In one aspect, the controller is further configured to: modify the stored ammonia slip limit data in response to a target value of a SCR catalyst temperature of the SCR catalyst or an ammonia to $NO_x$ ratio, the ammonia storage capacity of the SCR catalyst, an exhaust flow rate, a SCR catalyst inlet temperature at an inlet of the SCR catalyst, and an exhaust gas composition of the exhaust gas.

The ammonia storage capacity of the SCR catalyst degrades throughout its life and its data is useful for the SCR controller.

In one aspect, the controller is further configured to: receive a population SCR catalyst damage signal corresponding to an amount of SCR catalyst damage experienced by a plurality of vehicle SCR catalysts included in a respective plurality of vehicle aftertreatment systems, each of the plurality of vehicle aftertreatment systems being substantially similar to the aftertreatment system, and modify the short-term cumulative degradation estimate and the long-term cumulative degradation estimate based on the signal.

In one aspect, the population SCR catalyst damage signal is received by the controller via a cloud network or a remote server.

In one aspect, the controller is operably coupled to a telematics system.

In one aspect, the controller is further configured to: determine an aging value of the SCR catalyst based on the combined degradation estimate of the SCR catalyst, and transmit the aging value of the SCR catalyst to the telematics system for setting a preventive maintenance alert.

In another embodiment, a method is provided for a controller for controlling operation of an aftertreatment system configured to treat constituents of an exhaust gas produced by an engine, the aftertreatment system including a selective catalytic reduction (SCR) catalyst, the method comprises: generating a short-term cumulative degradation estimate of the SCR catalyst corresponding to reversible degradation of the SCR catalyst due to sulfur and/or hydrocarbons based on a SCR catalyst temperature parameter; generating a long-term cumulative degradation estimate of the SCR catalyst corresponding to thermal aging of the SCR catalyst based on the SCR catalyst temperature parameter; generating a combined degradation estimate of the SCR catalyst based on the short-term cumulative degradation estimate and the long-term cumulative degradation estimate; and adjusting an amount of reductant and/or an amount of hydrocarbons inserted into the aftertreatment system based on the combined degradation estimate.

In one aspect, the SCR catalyst temperature parameter comprises an inlet exhaust gas temperature at an inlet of the SCR catalyst, an outlet exhaust gas temperature at an outlet of the SCR catalyst, or a SCR catalyst temperature of the SCR catalyst; wherein the SCR catalyst temperature parameter is determined using a physical temperature sensor; wherein the SCR catalyst temperature parameter is calculated based on operating parameters of the exhaust gas.

In one aspect, the method further comprises modifying stored ammonia slip data corresponding to ammonia slip through the SCR catalyst relative to a SCR catalyst temperature based on at least the combined degradation estimate, and adjusting the amount of reductant and/or the amount of hydrocarbons inserted into the aftertreatment system based on the modified stored ammonia slip data.

In one aspect, the method further comprises modifying the stored ammonia slip data in response to: a target value of a SCR catalyst temperature of the SCR catalyst or an ammonia to $NO_x$ ratio, an exhaust flow rate, a SCR catalyst inlet temperature at an inlet of the SCR catalyst, and an exhaust gas composition of the exhaust gas.

In one aspect, the method further comprises receiving a population SCR catalyst damage signal corresponding to an amount of SCR catalyst damage experienced by a plurality of vehicle SCR catalysts included in a respective plurality of vehicle aftertreatment systems, each of the plurality of vehicle aftertreatment systems being substantially similar to the aftertreatment system, and modifying the short-term cumulative degradation estimate and the long-term cumulative degradation estimate based on the signal.

In one aspect, the method further comprises receiving the population SCR catalyst damage signal by the controller via a cloud network or a remote server.

In one aspect, the controller is operably coupled to a telematics system.

In one aspect, the method further comprises determining an aging value of the SCR catalyst based on the combined degradation estimate of the SCR catalyst, and transmitting the aging value of the SCR catalyst to the telematics system for setting a preventive maintenance alert.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope. The disclosure will be described with additional specificity and detail through use of the accompanying drawings.

Figure 1:
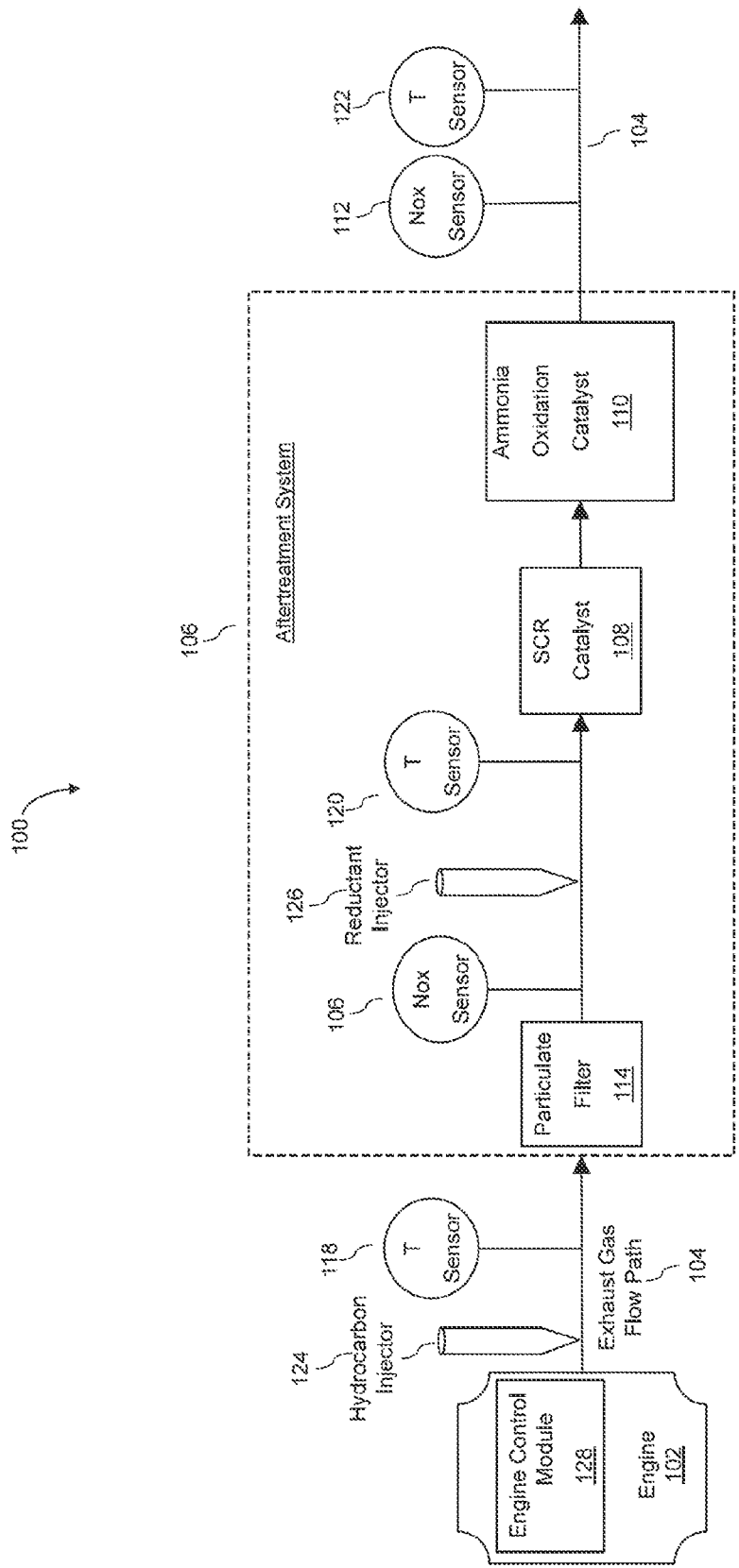
FIG. 1 illustrates an example system including an engine and an aftertreatment system.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for predicting with a real-time engine-aftertreatment data and physics based cumulative damage model, degradation of SCR catalyst performance in terms of regulating or controlling exhaust emissions from a combustion engine in a vehicle.

As stated earlier, SCR catalyst degradation is crucial in vehicles having aftertreatment systems. Many engine emission control strategies therefore incorporate a model for detection and calculation of the SCR catalyst degradation.

However, existing SCR catalyst degradation models use simple regression models that track only operating hours, mileage, and a number of regeneration events to forecast degradation rate of the SCR catalyst without taking into account the real time noise factors. Moreover, the simplistic regression models typically can only help identify an average SCR catalyst aging or degradation for a group of vehicles.

Therefore, the simplistic regression models cannot help a fleet operator, a maintenance manager, or any adaptive control system to identify SCR catalyst aging in a single vehicle or a sub-group within a population running in different vehicle applications, duty cycles, or ambient conditions, etc. Therefore, further technological developments are desirable in this area.

In recent times, knowledge of cumulative damage of SCR catalyst components has expanded significantly due to detailed performance and chemical analysis of real world aged (field-returned) engine-aftertreatment systems and the availability of corresponding real-time data capability of the engine control module (ECM) and accompanying data acquisition/transmission (e.g. data logger) systems. The real-time (e.g. 1 Hz) data from physical and virtual sensors, combined with knowledge of the physics/chemistry of SCR catalyst degradation systems has enabled the development of physics-based models that track the cumulative damage and resulting emissions performance degradation of the SCR catalyst elements that are contained in the aftertreatment system. Information on the cumulative damage in an individual aftertreatment systems compared to the expected cumulative damage in the vehicle population can inform preventive maintenance practices (e.g. maintenance monitor) or adaptive emission control algorithms.

Advantageously, the disclosed embodiments of the model use the information as mentioned above making it easier for the aftertreatment system and vehicle manufacturers to increase emissions compliance for the most challenging duty cycles and applications without excessive cost, size, and weight for an overdesigned component. Furthermore, increasingly stringent $CO_2$ standards (e.g., greenhouse gas emission standards) and increased proposed emissions useful life (EUL) requirements (over 1 million miles) result in reduced exhaust temperatures and longer durability requirements for the vehicle components and sub-systems. Advantageously, preventive maintenance practices using disclosed embodiments of the physics based cumulative damage model combined with adaptive controls and cloud-based data analytics can be effective to improve the long-term emissions capability of the vehicles.

According to certain embodiments disclosed herein is an apparatus and a method for to calculate SCR catalyst degradation in an aftertreatment system using a physics based cumulative damage model. The physics based cumulative damage model, also referred to as a degradation model, can be incorporated as a system or as part of the engine control module (ECM) of a vehicle.

The disclosed model may be implemented in hardware, software or any combination thereof. Furthermore, the model may be implemented as part of the ECM in a vehicle. Moreover, the disclosed model may be thought of as a system or a module. The disclosed model, module, or system may be part of an adaptive control system used by fleet operators at a vehicle manufacturing or testing plants.

In some embodiments, the disclosed physics based cumulative damage model is based on physical parameters such as ambient temperature, SCR catalyst outlet temperature, fleet trends, $NO_x$ variation, etc. Furthermore, in certain embodiments the disclosed model can be a short-term cumulative degradation model sensitive to the fuel flow and SCR catalyst temperature or a long-term cumulative degradation model sensitive to the signals from various temperature sensors in the SCR catalyst. Additionally, certain embodiments disclose an apparatus and methods of combining data analytics with the physics based model. A combined system as such can provide fleet learning capabilities and can be configured for use with a telematics system.

It may be noted by those of skill in the art that one key to successfully increasing energy efficiency, reducing emissions, and lowering energy costs in certain vehicles such as trucks is a sound knowledge of drive cycles and duty cycles. A good understanding of drive cycle (how a vehicle is used) and duty cycle (how much a vehicle is used) can help increase a truck's energy efficiency, reduce emissions and lower energy costs. The telematics system are typically used to collect information from graphical data during drive cycles and duty cycles.

For example, from a drive cycle's graphical data, critical vehicle operational statistics can be determined which can include: maximum speed, average speed, number and frequency of vehicle starts and stops, idle time, engine-off time, total engine hours per cycle, or other critical data such as power export time, power export demands, power take-off (PTO), dwell time during power export (this is when the engine is operating but no power is being exported), engine rpm during the power export cycle, power export load demand cycle (minimum, maximum, average, duration, etc.), or more. Similarly, data during duty cycles may typically include information about hours/shifts per day, days per week or other measurement cycle, total miles per measurement cycle, typical (average) load profile, peak load profile, and more.

In one example, the disclosed physics based cumulative damage model and data analytics can get updates from a telematics system regarding:
a. total fleet size and duty-cycle/applications statistics included in the fleet (i.e. fleet make-up);
b. application fleet size and duty-cycle/applications statistics included in that sub-group; and/or
c. customer fleet size and duty-cycle/applications statistics included in that sub-group Furthermore, in some examples the factors included in a fleet make-up may include horsepower rating of the engine, machine (vehicle) type, geographical location of vehicle operation or other factors. Additionally, the total fleet size may be defined as being equal to the sum of the same engine displacement and aftertreatment. Some examples of customer fleets such as Penske fleet or Swift fleet. The information collected from these sub-groups via telematics can be used to improve any related machines. It can also be used for adaptation of the cumulative damage model to determine the preventative (scheduled) maintenance limits.

The disclosed embodiments are explained with regard to SCR catalyst or diesel oxidation catalyst (DOC), however those may be applicable to other types of catalysts used in any other types of engines used in vehicles, boilers, electric heaters, or any other machines.

FIG. 1 illustrates an example system 100 including an engine 102 and an aftertreatment system 106. The system 100 includes an internal combustion engine 102 fluidly coupled to an exhaust gas flow path 104, and an aftertreatment system 106 disposed in the exhaust gas flow path 104. As can be appreciated by those skilled in the art, the aftertreatment system is configured to treat constituents of an exhaust gas produced by the engine 102.

The aftertreatment system 106 further includes a SCR catalyst 108, a particulate filter 114 and an ammonia oxidation catalyst 110 that oxidizes ammonia and/or urea slipping through the SCR catalyst 108, a temperature sensor 120 between the particulate filter 114 and the SCR catalyst 108, a $NO_x$ sensor 116 upstream of the SCR catalyst 108, and a reductant injector 126. In one example, the particulate filter 114 is a diesel particulate filter. The $NO_x$ sensor 116 can be either upstream or downstream of the particulate filter 114. The system 100 further includes a temperature sensor 118 upstream of the aftertreatment system 106, and a temperature sensor 122 downstream of the aftertreatment system 106, a $NO_x$ sensor 112 downstream of the ammonia oxidation catalyst 110, and an injector 124 that injects hydrocarbons to assist in regenerating the particulate filter 114.

Additionally, a temperature sensor (not shown) may also be disposed within the SCR catalyst 108 for measuring a bed temperature of the SCR catalyst 108. In other embodiments, the SCR catalyst temperature may be estimated based on an exhaust gas temperature, exhaust gas flow rate (e.g., at an inlet of the catalyst 108), physical properties of the catalyst 108 and/or dimensions of the SCR catalyst 108. In some embodiments, a plurality of SCR catalyst temperatures measured or estimated at various points along the length of the catalyst 108 may be used.

The aftertreatment system 106 may include any other components known in the art, and the components may be ordered in any arrangement. The selection and location of sensors are not limiting, and any arrangement of sensors, as well as selection of which sensors to include, are understood by those of skill in the art with the benefit of the disclosures herein.

The exemplary system 100 further includes an engine control module (ECM) 128, also referred to as controller 128, structured to perform certain operations to determine a SCR catalyst degradation. The controller 128 forms a portion of a processing subsystem including one or more computing devices having memory, processing, and communication hardware. The controller 128 may be a single device or a number of distributed devices, and the functions of the controller may be performed by hardware or software. The controller 128 includes one or more modules that are configured to execute the operations of the controller functionally. The description herein including modules emphasizes the structural independence of the aspects of the controller 128, and illustrates one grouping of operations and functions of the controller 128. Other groupings that execute similar overall operations are understood to be within the scope of the present application. Modules may be implemented in hardware and/or software on computer readable medium, and modules may be distributed across various hardware or software components. The operations of specific models may be combined or divided in some embodiments.

Figure 2:
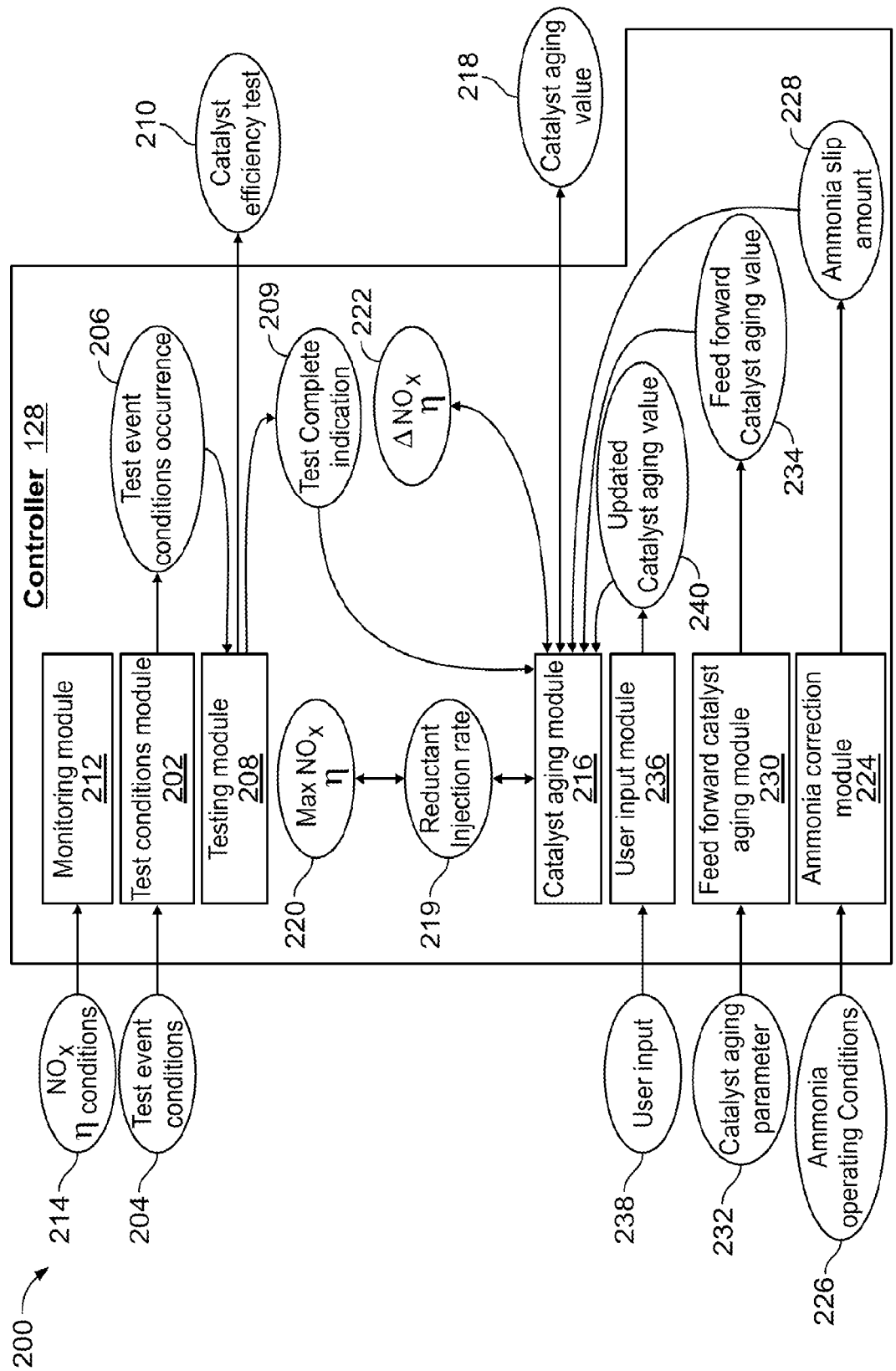
FIG. 2 illustrates a block diagram of an existing system for detection of a SCR catalyst degradation.

FIG. 2 illustrates a block diagram of an existing processing sub-system 200 having the controller 128 for detection of aftertreatment SCR catalyst degradation. The controller 128 includes a monitoring module 212, a test conditions module 202, a testing module 208, and a SCR catalyst aging module 216, a user input module 236, a feedforward SCR catalyst aging module 230, and an ammonia correction module 224. The test conditions module 202 interprets a test conditions event occurrence for the SCR catalyst, the testing module 208 commands a SCR catalyst efficiency test in response to the test conditions event occurrence, the monitoring module 212 interprets operating condition(s) indicative of a $NO_x$ conversion efficiency during the SCR catalyst efficiency test, and the catalyst aging module 216 determines a SCR catalyst aging value in response to the at least one operating condition. The feedforward SCR catalyst aging module 230 interprets a SCR catalyst aging parameter, and an aftertreatment regeneration model intermittently performs a regeneration event to remove particulates from the particulate filter. The feedforward SCR catalyst aging module 230 further determines a feedforward SCR catalyst aging value in response to the regeneration event, and the SCR catalyst aging module 230 adjusts the SCR catalyst aging value in response to the feedforward SCR catalyst aging value. The SCR catalyst aging parameter 232 includes any information in the system 100 that is estimated to affect the degradation of the SCR catalyst 108, also referred to as a SCR catalyst.

The controller 128 includes a user input module 236 that interprets a user input 238 and provides an updated SCR catalyst aging value 240. The catalyst aging module 216 adjusts a SCR catalyst aging value 218 in response to the updated SCR catalyst aging value 240. The adjustment of the SCR catalyst aging value 218 in response to the updated SCR catalyst aging value 240 may be complete or partial. A maintenance operation may involve replacing the SCR catalyst 108, and a technician may utilizes the user input 238 to provide an updated SCR catalyst aging value 240 that resets the SCR catalyst aging value 218 to a value consistent with a new SCR catalyst.

More information about the existing embodiments of the sub-system are disclosed in the U.S. Pat. No. 8,726,723 B2, which is incorporated fully herein by reference.

Figure 3:
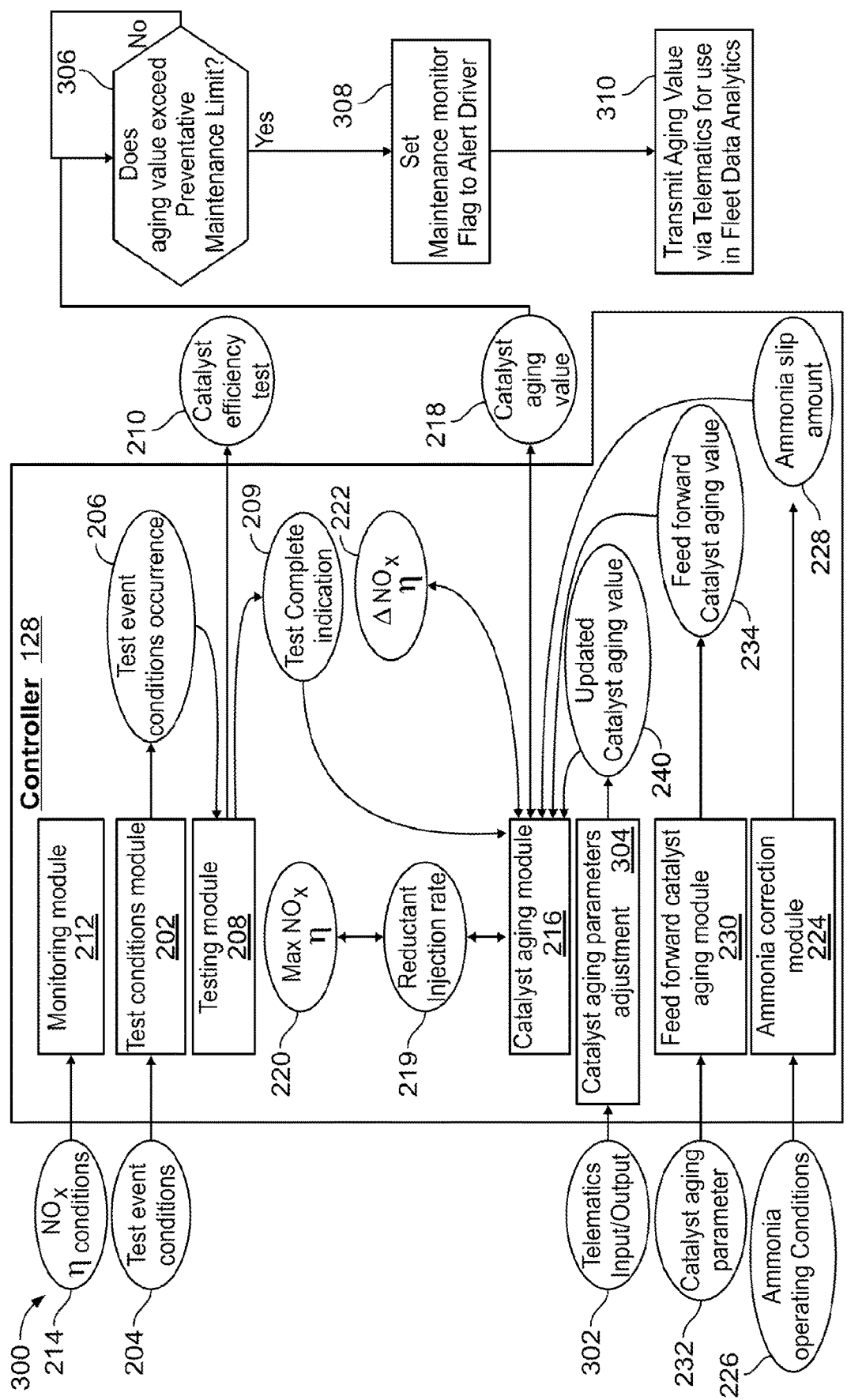
FIG. 3 illustrates a block diagram of an example system incorporating the physics based cumulative damage model for detection of a SCR catalyst degradation, according to an embodiment of the present disclosure.

FIG. 3 illustrates a block diagram of an example sub-system 300 incorporating a physics based cumulative damage model for detection of aftertreatment SCR catalyst degradation, according to an embodiment of the present disclosure. The sub-system 300 can be considered as a modification to the sub-system 200, wherein the cumulative damage model is be embedded in the ECM 128. Referring back to FIG. 2, a telematics input/output module 302 can be used in place of the user input 238 and the catalyst aging parameters adjustment module 304 can be used in place of the user input module 236, in one embodiment. In one example, the telematics input/output module 302 may be configured to receive the telematics input to the module 304. In one example, the module 304 may be configured to adjust the SCR catalyst aging parameters based on a variety of fleet trends. Furthermore, in one example the sub-system 300 may also include modules 306, 308, and 310. The module 306 may check if the SCR catalyst aging value exceeds a predefined a limit or not. If it does, then a maintenance monitor flag may be activated by the module 308 to alert the driver of the vehicle. Further, the module 310 may transmit the SCR catalyst aging value via telematics for use in fleet data analytics as explained earlier in the specification. For example, the fleet data analytics may include information regarding fleet size, horsepower rating of the engine, machine (vehicle) type, geographical location of vehicle operation, or other factors.

In other words, the controller 128 can be considered to be operably coupled to a telematics system. Furthermore, the controller 128 is configured to determine an aging value of the SCR catalyst based on a combined degradation estimate of the SCR catalyst, and transmit the aging value of the SCR catalyst to the telematics input/output module 302 for setting a preventive maintenance alert for a user. The SCR catalyst aging value can also be used in fleet data analytics.

Figure 4:
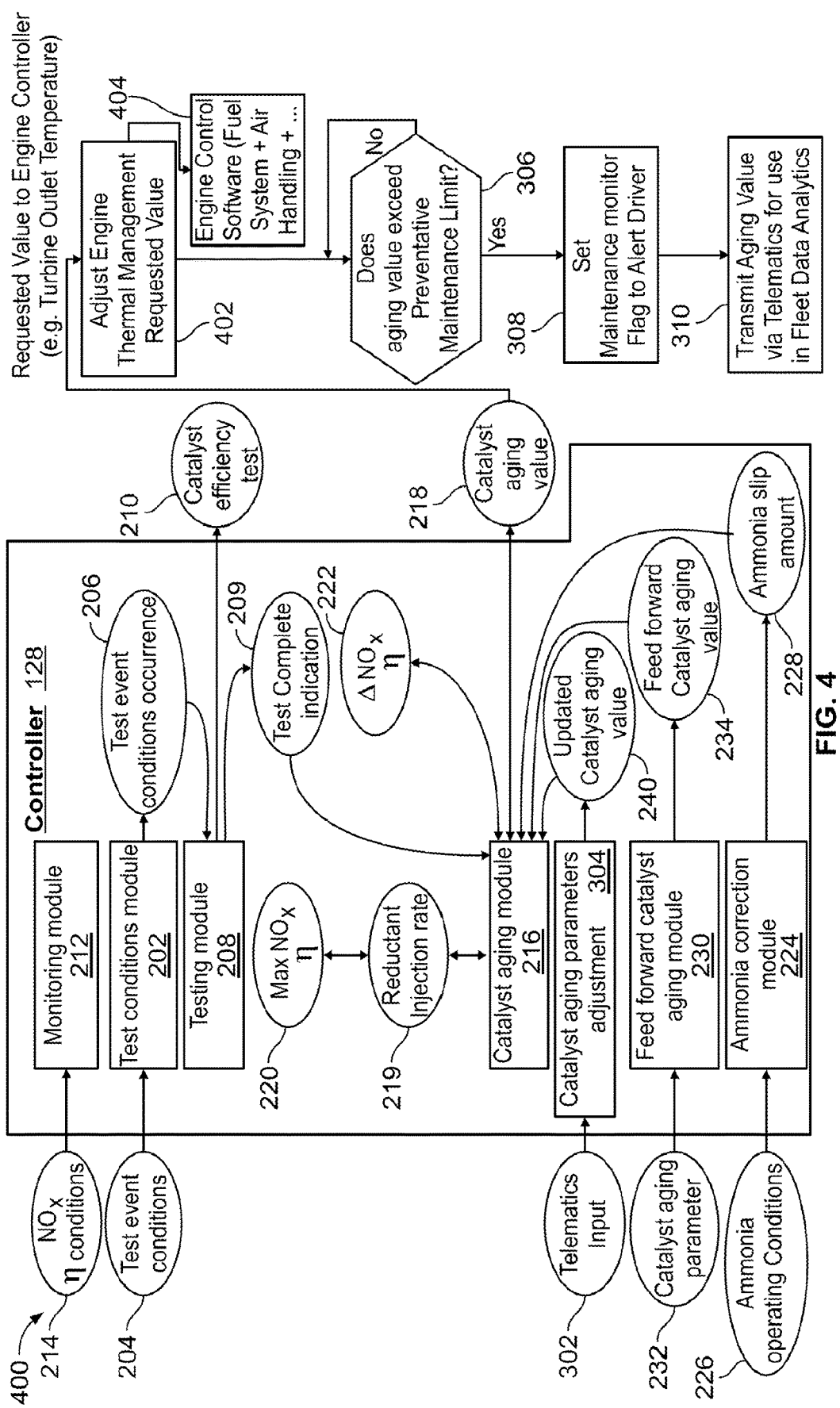
FIG. 4 illustrates a block diagram of another example system incorporating the physics based cumulative damage model for detection of the SCR catalyst degradation, according to an embodiment of the present disclosure.

FIG. 4 illustrates a block diagram of another example sub-system 400 incorporating the physics based cumulative damage model for detection of aftertreatment SCR catalyst degradation, according to an embodiment of the present disclosure. The sub-system 400 may be considered as a modified sub-system 300 including additional modules 502 and 504. The module 402 may be used to adjust the engine thermal management requested value and the module 404 might modify the engine control software for fuel system and air handling.

Figure 5:
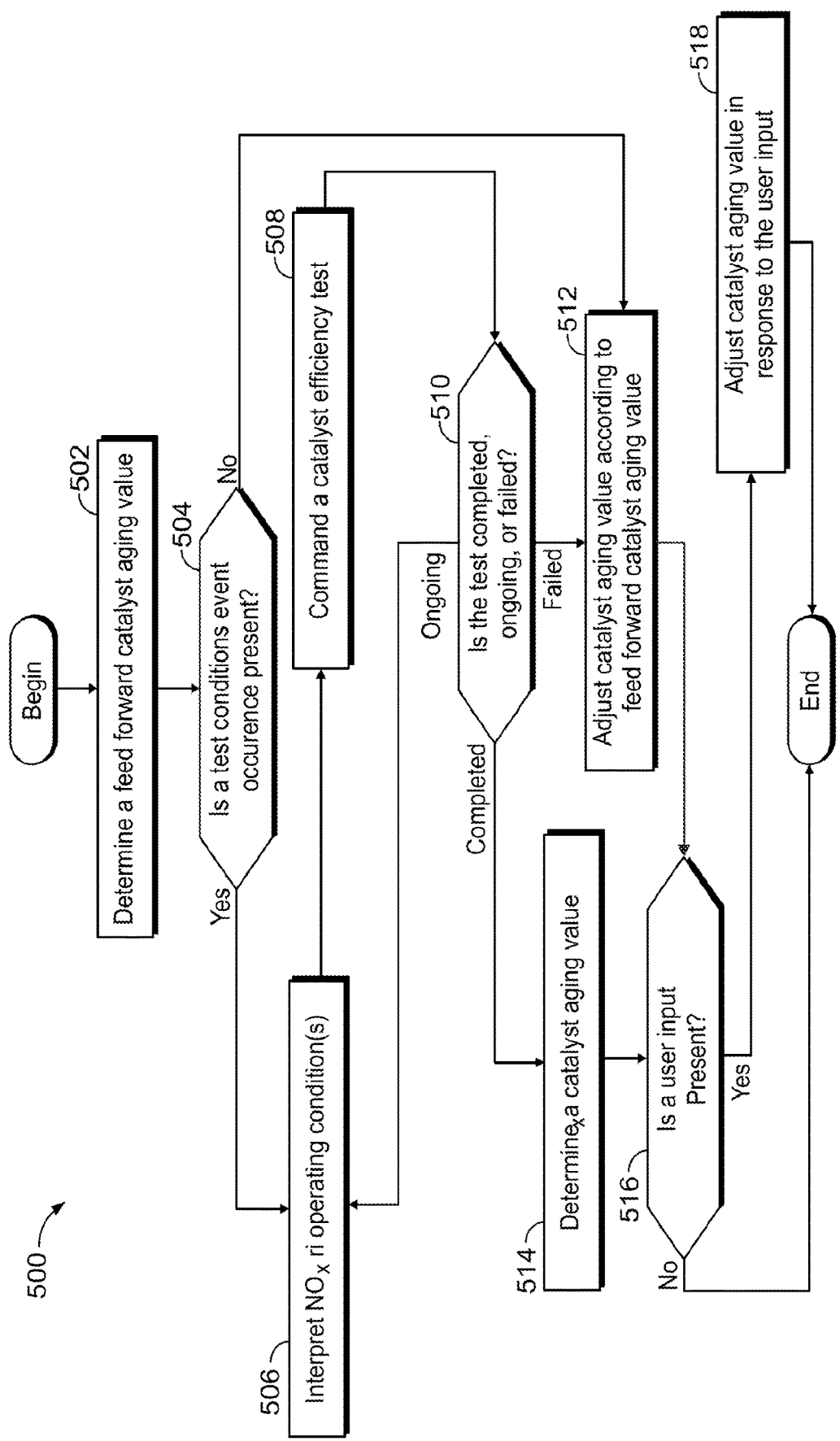
FIG. 5 is a schematic flow diagram of an existing procedure for detecting a SCR catalyst degradation.

FIG. 5 is a schematic flow diagram of an existing procedure 500 for determining SCR catalyst degradation. The procedure 500 includes an operation 502 to determine a feedforward SCR catalyst aging value and an operation 504 to determine whether a test conditions event occurrence is present.

In response to the operation 504 determining that a test conditions event occurrence is present, the procedure 500 includes an operation 506 to interpret $NO_x$ operating conditions and an operation 508 to command a SCR catalyst efficiency test.

The procedure 500 further includes an operation 510 to determine whether the SCR catalyst efficiency test is completed, ongoing, or failed. In response to the operation 510 determining that the SCR catalyst efficiency test is ongoing, the procedure 500 includes operations 506, 508 to continue monitoring and commanding the test until the test completes or fails.

In response to the operation 510 determining the test has failed, and/or in response to the operation 504 determining that a test conditions event occurrence is not present, the procedure 500 includes an operation 512 to adjust a SCR catalyst aging value according to a feedforward SCR catalyst aging value.

In response to the operation 510 determining the test has completed, the procedure 500 further includes an operation 514 to determine the SCR catalyst aging value. The procedure 500 further includes an operation 516 to determine whether a user input is present, and an operation 518 to adjust the SCR catalyst aging value in response to a determination that the user input is present.

Figure 6:
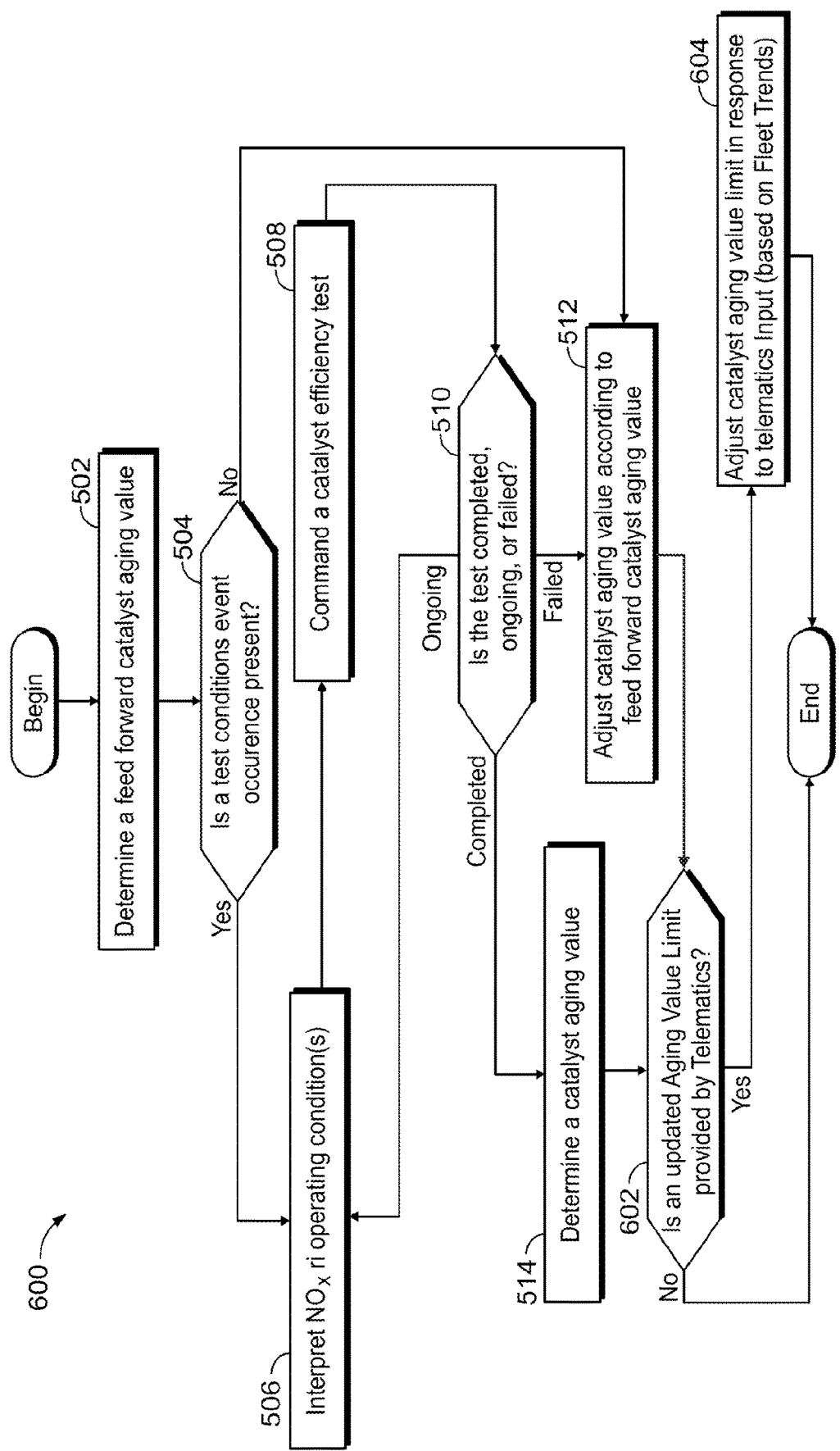
FIG. 6 is a schematic flow diagram of an example procedure for detecting the SCR catalyst degradation, according to an embodiment of the present disclosure.

FIG. 6 is a schematic flow diagram of an example procedure 600 for detecting SCR catalyst degradation, according to an embodiment of the present disclosure. The procedure 600 may be considered a modification of the procedure 500 wherein the modules 516 and 518 can be replaced by the modules 602 and 604. In one example, the module 602 may be configured to check if an updated aging value limit is provided by the telematics. If so, then the module 604 may adjust the SCR catalyst aging value limit in response to telematics input based on various fleet trends. As explained earlier, the fleet trends may include information regarding fleet size, horsepower rating of the engine, machine (vehicle) type, geographical location of vehicle operation, or other factors.

Figure 7:
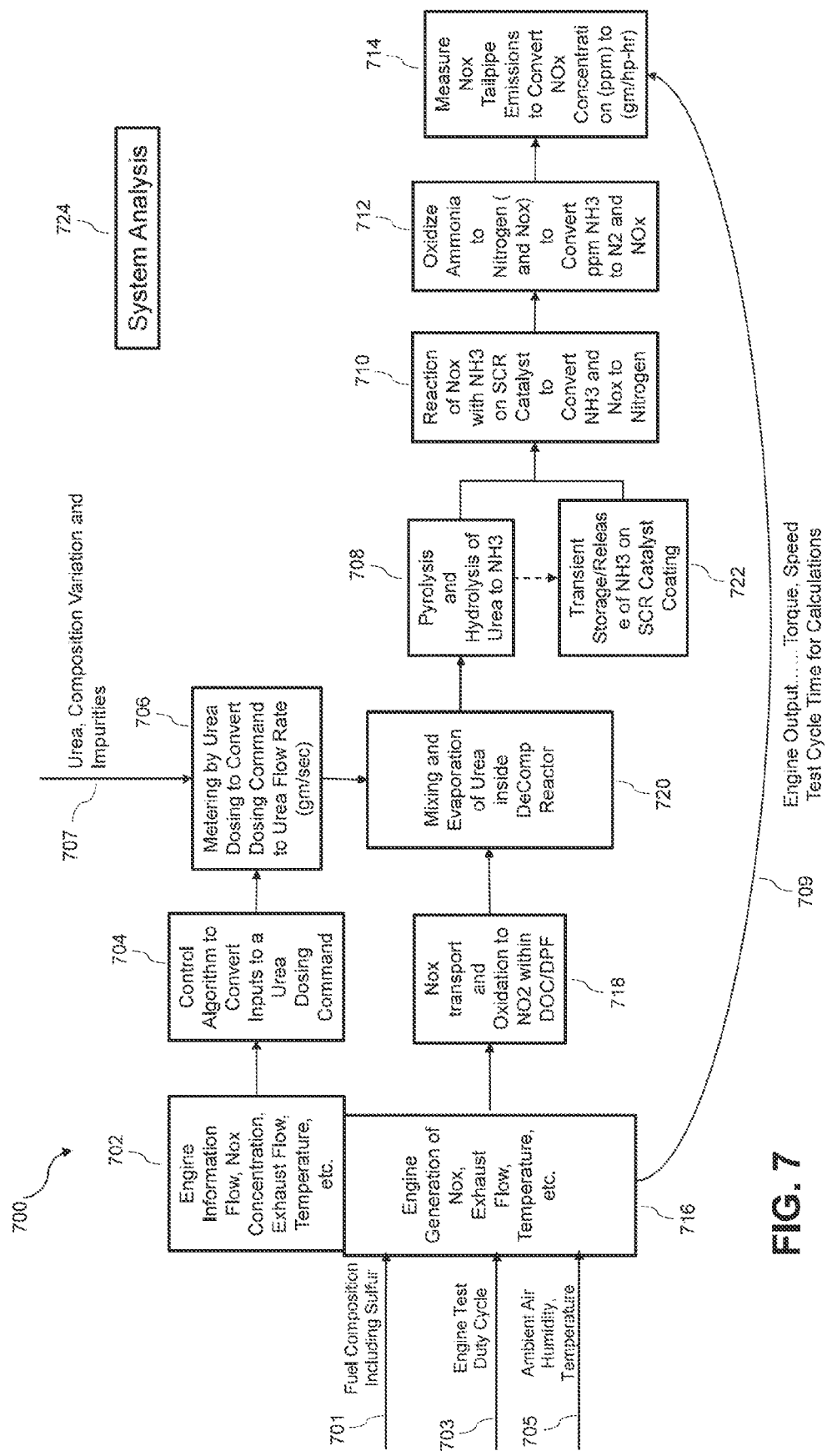
FIG. 7 illustrates a block diagram of an existing type of model for the engine 102 and the aftertreatment system 106 of FIG. 1.

FIG. 7 illustrates a block diagram of an existing type of engineering model 700 for the engine 102 and the aftertreatment system 106 of FIG. 1. More particularly, the model 700 is a SCR model based mainly on NO variation. The model 700 further includes modules 702 (engine information flow, NO concentration, exhaust flow rate, temperature, etc.), 704 (control algorithm to convert inputs to a urea dosing command), 706 (metering by urea dosing to convert dosing command to urea flow rate (gm/sec)), 708 (pyrolysis and hydrolysis of urea to $NH_3$), 710 (reaction of NO with $NH_3$ on SCR catalyst to convert $NH_3$ and NO to nitrogen), 712 (oxidize ammonia to nitrogen (and $NO_x$) to convert ppm $NH_3$ to $N_2$ and $NO_x$), 714 (measure $NO_x$ tailpipe emissions to convert $NO_x$ concentration (ppm) to (gm/hp-hr)), 716 (engine generation of $NO_x$, exhaust flow rate, temperature, etc.), 718 ($NO_x$ transport and oxidation to $NO_2$ within DOC/DPF), 720 (mixing and evaporation of urea inside deComp reactor), and 722 (transient storage/release of $NH_3$ on SCR catalyst coating).

FIG. 7 also illustrates signals 701 (fuel composition including sulfur), 703 (engine test duty cycle), 705 (ambient air humidity, temperature), 707 (urea, composition variation and impurities), and 709 (engine output, torque, speed, test cycle time for calculations). It may be appreciated that all the modules and signals are configured to calculate, detect, or predict variations in the levels of $NO_x$ (nitrogen oxides).

In one example, the modules 716, 718, 706, 720, 708, 722, 710, and 712 may represent controls. The modules 702 and 704 represent the software control algorithms, which may be implemented within the ECM 128. The signal 709 and the module 714 correspond to the measurement systems used by regulatory agency (e.g. Environmental Protection Agency (EPA) or California Air Resources Board (CARE)) to measure and calculate the emissions in engineering units (e.g. grams/horsepower-hour or grams/mile) that are compared to the published regulatory standards for $NO_x$, $N_2O$, and ammonia.

As can be easily understood, in the model 700, the module 702 controls the parameters such as engine information flow, $NO_x$ concentration, exhaust flow rate, and temperature, etc. provides an output to the module 704 that includes a control algorithm to convert inputs to a urea dosing command. The output of the 704 block is coupled to the module 706. The module 706 may control the urea flow rate in response to the input parameters defined by urea composition variation and impurities and the input from the block 704. The module 716 controls engine generation of $NO_x$, exhaust flow rate, temperature, etc., in response to the signals or input parameters such as fuel composition 701, the engine test duty cycle 703, the ambient air humidity, and temperature 705.

The module 718 controls $NO_x$ transport and oxidation to $NO_2$ within a diesel oxidation SCR catalyst (DOC)/diesel particulate filter (DPF), in response to the input from the module 716. The module 706 may be configured to control metering by urea dosing to convert dosing command to urea flow rate (gm/sec). The module 720 controls mixing and evaporation of urea inside decomposition reaction (DeComp reactor) in response to receiving inputs from the modules 706 and 718. The module 708 controls pyrolysis and hydrolysis of urea to $NH_3$. The module 722 controls transient storage/release of $NH_3$ on SCR catalyst coating in response to an input from the block 708.

The module 710 may control the reaction of NO with $NH_3$ on SCR catalyst to convert $NH_3$ and $NO_x$ to nitrogen in response to inputs from the modules 708 and 722. The module 712 may oxidize ammonia to nitrogen (and $NO_x$) to convert ppm $NH_3$ to $N_2$ and $NO_x$ in response to an input from the block 710. The module 714 may measure $NO_x$ tailpipe emissions to convert $NO_x$ concentration (ppm) to (gm/hp-hr) in response an input from the block 712. The module 724 may be configured to perform a system analysis. In one example, the system analysis module 724 may be configured to facilitate interactions between modules 716, 718, 720, 708, 722, 710, 712, and 714. In one example, a degradation calculated by the module 718 may be compounded with a degradation calculated by the module 710 via the system analysis module 724. More exemplary details about this will be discussed later in the specification.

Lastly, 709 represents a test cycle time for measuring the engine output, torque, and speed, and test cycle time for calculations.

As can be noted, the model 700 does not take into consideration the noise factors such as the SCR catalyst temperature or the fuel flow or anything that affects SCR catalyst degradation. As will be explained with respect to FIG. 8A, a cumulative damage model for catalytic degradation or SCR is configured to take into calculation the noise factors.

Figure 8A:
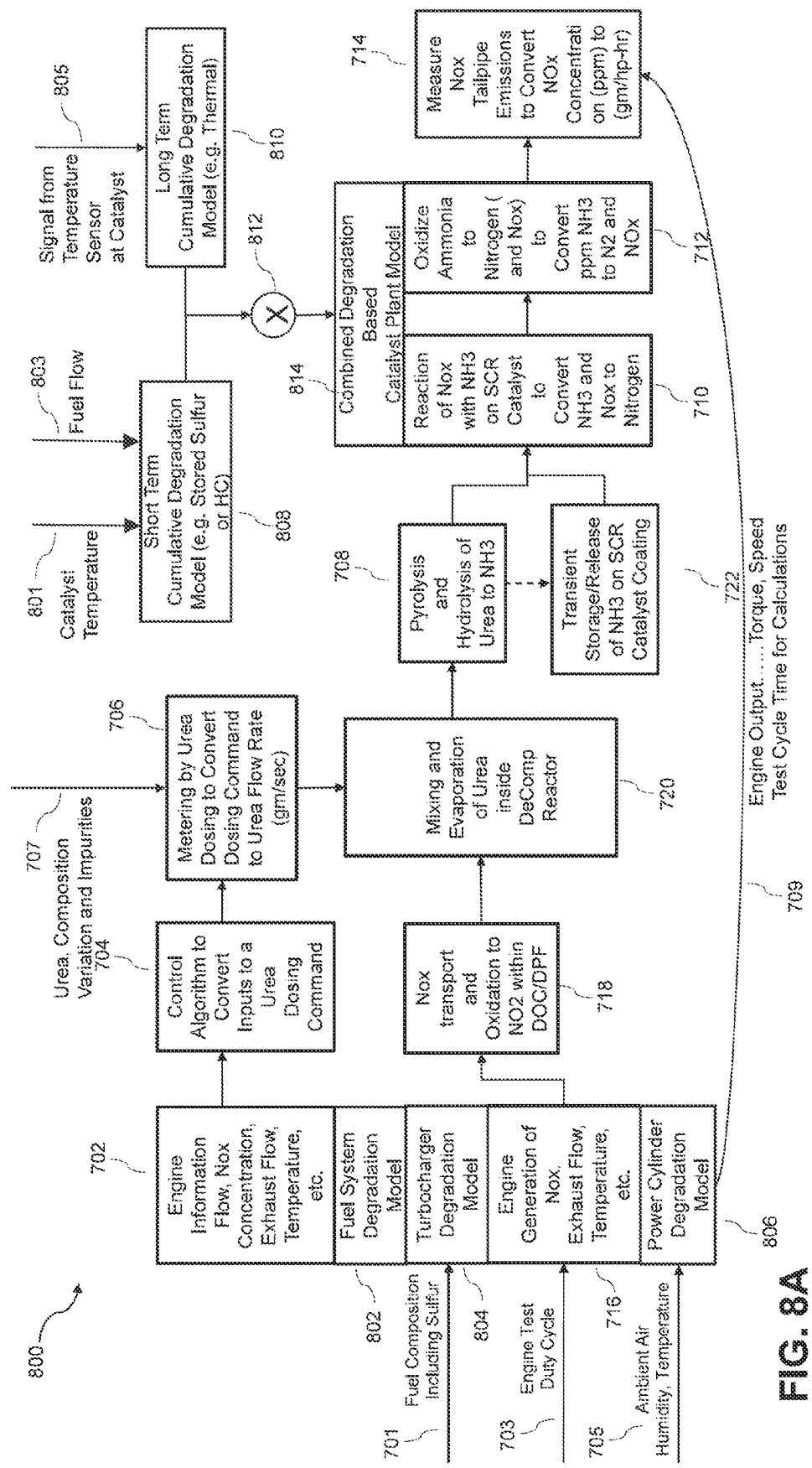
FIG. 8A illustrates a block diagram of an example of a cumulative damage model for calculating the SCR catalyst degradation, according to an embodiment of the present disclosure.

FIG. 8A illustrates a block diagram of an example of a cumulative damage model 800 for calculating SCR catalyst degradation, according to an embodiment of the present disclosure. In some examples, the model 800 may be considered as a cumulative damage model. In some other examples, the model 800 may be considered as a combination of the $NO_x$ variation model 700 of FIG. 7 and additional blocks, which collectively make up a cumulative damage model, according to an embodiment of the present disclosure. FIG. 8A illustrates an example model 800 for an aftertreatment system, according to an embodiment of the present disclosure. As is evident by a simple comparison, the model 800 shares many common modules and features with the model 700. Additionally, the model 800 includes a few independent cumulative damage models such as a fuel system degradation model 802, a turbocharger degradation model 804, a power cylinder degradation model 806, a short-term cumulative degradation model 808 and a long-term cumulative degradation model 810, and a combined degradation estimate based SCR catalyst plant model 814. Each of these models can be used to estimate a degradation of the SCR catalyst corresponding to a specific physical or chemical parameter. For example, the short-term cumulative degradation model 808, hereafter the short-term degradation model or short-term model or model 808, can estimate a degradation corresponding to an amount of sulfur or hydrocarbons stored or formed in the SCR catalyst over a period of time. The long-term cumulative degradation model 810, hereafter the long-term degradation model or long-term model or model 810, can estimate a degradation corresponding to thermal aging of the SCR catalyst over a period of time.

In some other examples, each of the modules or blocks 802, 804, 806, 808, 810, and 814 may be independently implemented as separate models.

In one example, the short-term cumulative degradation model 808 is coupled to receive signals or parameters such as SCR catalyst temperature 801 and fuel flow 803. Similarly, the long-term cumulative degradation model 810 is coupled to receive a signal from the temperature sensor SCR catalyst 805. The outputs of the short-term cumulative degradation model 808 and the long-term cumulative degradation model 810 may further be combined by a signal mixer 812 to form a combined degradation estimate. The output of the signal mixer 812 may further be provided as an input to the combined degradation estimate based SCR catalyst plant model 814.

As set forth earlier in the specification, a short-term degradation is related to sulfur storage and release. Further, it may be appreciated by those skilled in the art that in a Cu—Z SCR catalyst, sulfur typically adsorbs primarily on active Cu sites in a 1:1 molar ratio. Therefore, if the total number of active copper sites per unit washcoat volume as is represented by $\Omega_{Cu}$, then the decrease caused by sulfur adsorption in the number of active Copper sites that can participate in SCR, can be represented mathematically as $\Omega_{Cu}(1-\theta_S)$.

In other words, the number of copper sites before and after adsorption can be represented as:

$$\text{Number of copper sites before sulfur exposure} = \Omega_{Cu} \quad (1)$$

$$\text{Number of copper sites after sulfur exposure} = \Omega_{Cu}(1-\theta_S) \quad (2)$$

In the equation (2) above, $\theta_S$ represents the coverage of sulfur on copper sites, governed by the adsorption isotherm equation as follows:

$$\theta_S = \frac{K_{eq} ySOx}{1 + K_{eq} ySOx} \quad (3)$$

In the equation (3) above, Keq represents the adsorption equilibrium constant and ySOx represents the SCR inlet $SO_x$ mole fraction. The decrease in active copper leads to a reduction of the SCR rates. SCR rates before and after sulfur exposure are represented below using standard SCR as an example:

SCR rate before sulfur exposure $$r_{scr_{pre}} = k_{scr} y_{NO} y_{O_2}^{0.3} \theta_{NH_3} \Omega_{Cu} \quad (4)$$

SCR rate after sulfur exposure $$r_{scr_{post}} = k_{scr} y_{NO} y_{O_2}^{0.3} \theta_{NH_3} \Omega_{Cu} (1-\theta_S) \quad (5)$$

In the equations (4) and (5) above, $r_{scr}$ represents the SCR rate in mol/m³$_{washcoat}$-s, $k_{scr}$ represents the Arrhenius SCR rate constant in 1/s, $y_{NO}$ the NO mole fraction, $y_{O_2}$ represents the $O_2$ mole fraction, and $\theta_{NH_3}$ the overall surface coverage of $NH_3$. Those of skill in the art may appreciate that a deactivation mechanism is a generic term to represent catalyst aging. This would include any physio-chemical mechanism that may alter the state of the catalyst, leading to loss of performance. One way to lose performance is through loss of reducible Cu sites, which is what happens upon sulfur poisoning. The above mentioned decrease in active copper sites, also referred to as a deactivation mechanism, is reversible, since desorption of sulfur can lead to a decrease in the value of theta and a corresponding recovery of SCR performance.

In one example, the equation (5) may be considered as a short-term cumulative degradation equation. As can be appreciated, the equations (1) to (4) lead up to the equation (5) which further provides a first reference value for a combined degradation estimate as will explained later in the specification.

As set forth earlier in the specification, a long-term degradation is related to hydrothermal aging. Those skilled in the art may appreciate that hydrothermal aging leads to a loss of Brønsted acid sites, which can be modeled using the following equations:

$$\frac{1}{\Omega_{H_{norm}}} = 2.53 * 10^8 e^{\left(\frac{-168733}{RT_{age}}\right)} t_{age} + 1 \quad (6)$$

$$\Omega_{H_{norm}} = \frac{\Omega_H}{\Omega_{H_{550°C.-1h}}} \quad (7)$$

$$\Omega_{Cu \cdot NH_3} = 530.48 - 1.31 \Omega_H \quad (8)$$

where $k_{age}$ represents the rate constant for hydrothermal aging, $\Omega_H$ represents the number density of Brønsted acid sites in mol/m³$_{washcoat}$, and $\Omega_{Cu \cdot NH_3}$ represents the storage capacity of copper sites in mol/m³$_{washcoat}$. It may be appreciated from the above equations by those skilled in the art that $\Omega_H$ decreases with aging.

These changes can be further used to estimated $NH_3$ storage loss using:

$$\omega_{NH_3} = \left(MW_{NH_3} \frac{WL}{\rho_w}\right)\left(\Omega_{Cu \cdot NH_3} \theta_{Eq_{Cu}} + \Omega_H \left(\theta_{Eq_{ZNH_4}} + 2\theta_{Eq_{ZNH_4NH_3}}\right) + \Omega_p \theta_{Eq_P}\right) \quad (9)$$

In the equation (9) above, $\omega_{NH_3}$ is the $NH_3$ storage in g/L$_{cat}$, $MW_{NH_3}$ is the molecular weight of $NH_3$ in kg/mol, WL is the washcoat loading in g/L$_{cat}$, $\rho_w$ is washcoat density in kg/m³, $\Omega_i$ is the density of active site i in mol/m³$_{washcoat}$ and $\theta_{Eqi}$ is the equilibrium surface coverage of active site i.

In one example, the equation (9) may be considered as a long-term cumulative degradation equation. As can be appreciated, the equations (6) to (8) lead up to the equation (9) which further provides a second reference value for a combined degradation estimate as will explained later in the specification.

In one example, a combined degradation estimate may be given by:

combined degradation estimate=short-term cumulative degradation (given by (5))+long-term cumulative degradation (given by (9)) which can be further given by:

$$\text{combined degradation estimate} = r_{scr_{post}} + \omega_{NH_3} \quad (10)$$

In other examples, the combined degradation estimate may be given by:

combined degradation estimate=(1−short-term cumulative degradation)*(1−long-term cumulative degradation), which can be further given by:

$$\text{combined degradation estimate} = (1 - r_{scr_{post}}) * (1 - \omega_{NH_3}) \quad (11)$$

The equation (11) above is consistent with the reliability block diagram described in [00116].

Figure 8B:
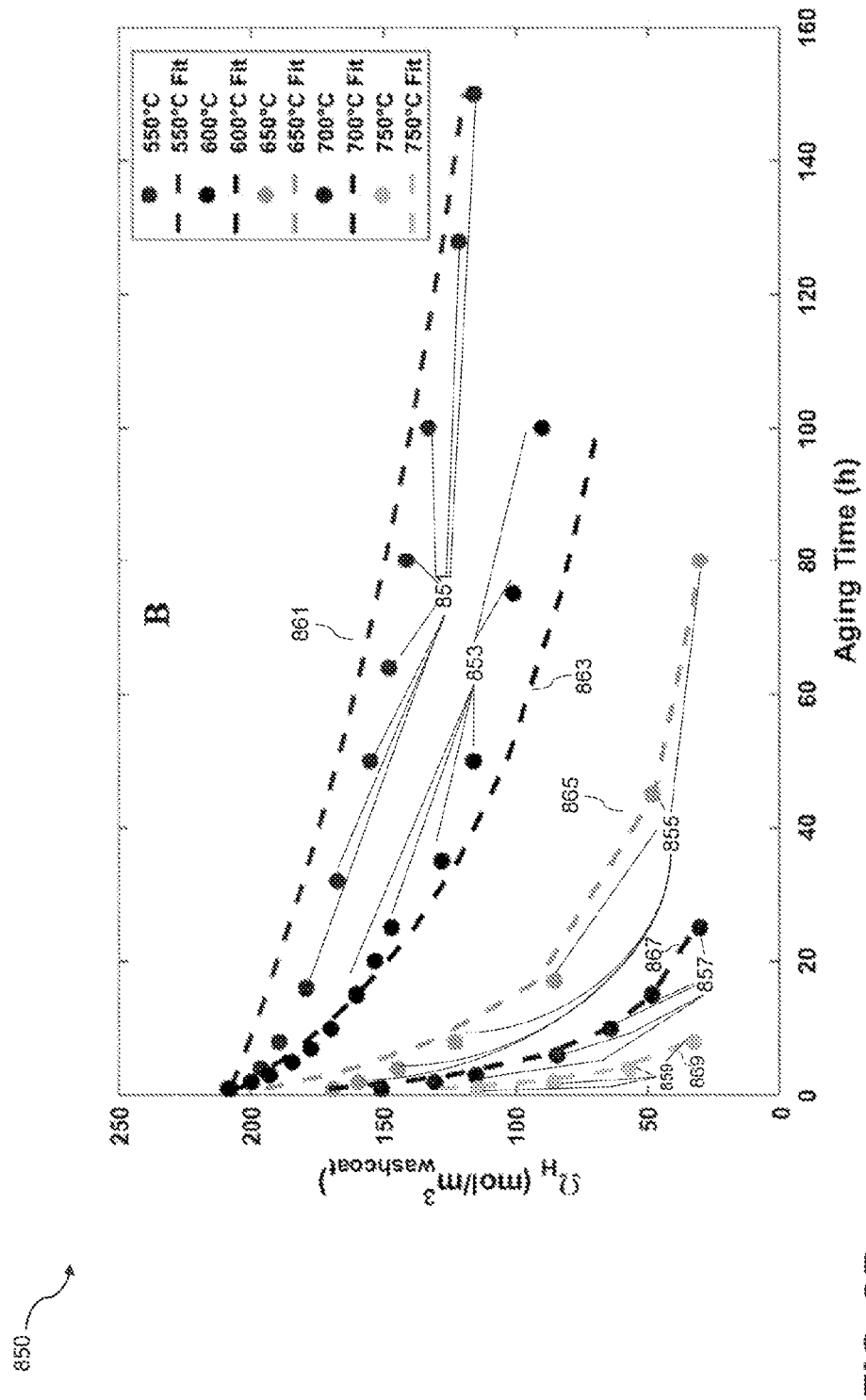
FIG. 8B provides a graph showing an example of hydrothermal aging of an SCR catalyst.

FIG. 8B provides an example graph 850 illustrating actual results of thermal aging of an SCR catalyst estimated using a kinetic model and regression. The graph 850 is a graph of $\Omega_H$ which represents the number density of Brønsted acid sites in mol/m³$_{washcoat}$ versus aging time (h) in hours. As can be seen, the graph 850 includes various set of points 851, 853, 855, 857, and 859 which are kinetic model estimated site densities ($\Omega_H$) at temperatures 550° C., 600° C., 650° C., 700° C., and 750° C. respectively.

A kinetic model for a site density includes identifying $NH_3$ storage kinetics on Brønsted, Copper, and Physisorbed sites. For example, each point in the set 851, represents $NH_3$ storage kinetics on an individual active site at 550° C. The other sets also represent $NH_3$ storage kinetics for the same or different sites. A kinetic model may be formed by considering $NH_3$ adsorption with at least four different types of energetics, associated with different types of active sites. For example, active sites may be categorized as weak or strong Brønsted acid sites, or lumped ZCu, Z2Cu and ZCuOH Copper sites or lumped Physisorbed sites. Further, in one example, a type-II BET isotherm may be used for estimating adsorption on Brønsted acid sites, a Temkin isotherm may be used for estimating adsorption on lumped copper sites, and a Langmuir isotherm may be used for estimating adsorption on lumped Physisorbed sites. Some other methods in the art may also be used for making the kinetic model as shown in the graph 850.

The graph 850 further illustrates various curves 861, 863, 865, 867, 869, which are regression fits for the temperatures 550° C., 600° C., 650° C., 700° C., and 750° C. respectively calculated using one or more of the equations (6) to (11).

It may be appreciated by those skilled in the art that the SCR catalyst typically includes a site (acid site) responsible for low temperature $NH_3$ storage, which does not change with hydro-thermal aging and therefore not shown with regard to the aging model or the graph. This low temperature acid site can be attributed to physisorbed $NH_3$ and is a fixed low temperature storage site, therefore, not tracked with aging but is required in the equation for estimating $NH_3$ storage. This site has a negligible contribution to storage above 250° C.

As can be seen, the regression fitted lines 861, 863, 865, 867, and 869, closely match the kinetic model sets of points 851, 853, 855, 857, and 859 respectively.

The signal 801 and 805 can be two different signals. In one embodiment, the signal 801 can be derived from an actual exhaust gas temperature sensor at the inlet or outlet or both of the SCR catalyst. In a second embodiment, the signal 801 can be derived from a virtual sensor for the inlet gas temperature of the SCR catalyst. In a third embodiment the signal 801 can be derived from a temperature sensor disposed within a SCR catalyst to measure the SCR catalyst bed temperature. Referring back to FIG. 1, a temperature sensor may be disposed upstream of or on the SCR catalyst 108.

Similarly, the signal 805 can be derived from an actual exhaust gas temperature sensor at the inlet or outlet or both of the SCR catalyst. In some examples, the signal 805 can also be derived from a virtual sensor or a sensor disposed on the catalyst bed.

In one example, the time-scale for the short-term cumulative degradation model 808 can be in single digits or in tens of hours, whereas the time-scale of the long-term model 810 may be hundreds or thousands of hours. Furthermore, the short-term model cumulative degradation 808 is unique in terms of its implementation as it may correspond to degradation mechanisms that are reversible in real world application. For example, the short-term cumulative degradation model 808 can correspond or may be used to estimate the amount of sulfur storage on the SCR catalyst coating at low exhaust temperatures or the amount of sulfur release from the SCR catalyst at high exhaust temperatures or both.

In other words, in one example, the short-term model 808 is configured to generate a short-term cumulative degradation estimate of the SCR catalyst corresponding to a reversible degradation of the SCR catalyst due to sulfur and/or hydrocarbons based on a SCR catalyst temperature parameter. Additionally, the long-term model 810 is configured to generate a long-term cumulative degradation estimate corresponding to thermal aging of the SCR catalyst based on the SCR catalyst temperature parameter. Furthermore, the SCR catalyst temperature parameter can comprise an inlet exhaust gas temperature at an inlet of the SCR catalyst, an outlet exhaust gas temperature at an outlet of the SCR catalyst, or a SCR catalyst temperature of the SCR catalyst or more. In one example, the inlet exhaust gas temperature, the outlet exhaust gas temperature, or the SCR catalyst temperature can be determined using a physical temperature sensor or can be calculated based on operating parameters of the exhaust gas.

These temperatures are measured in the exhaust stream upstream and downstream of the oxidation catalyst (e.g., a diesel particulate filter) the virtual internal temperature sensors are predicted (using an embedded heat-transfer/thermodynamic software model in the ECM) inside the cylindrical SCR catalyst element at one or more axial and radial positions inside the SCR catalyst element.

The combined degradation estimate based SCR catalyst plant model 814 can be a combination of a real-time SCR catalyst plant model (not shown) which can be a real-time simulation or a plant model of the physical and chemical reactions that occur in modules 710 and 712 shown in FIG. 7. The combined degradation estimate from the short-term model 808 and the long-term model 810 can be incorporated into the real-time SCR catalyst plant model (not shown) to form the combined degradation estimate based SCR catalyst plant model 814. Furthermore, expected results from the combined degradation estimate based SCR catalyst plant model 814 can be compared to the observed results from the tailpipe $NO_x$ sensor as shown in the module 714 within the ECM 128 or via the telematics input/output module 302 or via data analytics.

The fuel system degradation model block 802, the turbocharger degradation model block 804, and power cylinder degradation model block 806 are configured to track key performance of the engine components using real-time data. The engine components may include fuel injector, turbocharger, power cylinders, sensors, and actuators that effect emissions performance, oil consumption, and temperature out of the engine, all of which may collectively determine the engine's emissions capability over long periods of time.

Various degradation models within the engine represented as blocks 802, 804, and 806 can cause the engine-out emissions concentrations, exhaust flow rate, and exhaust temperature (716) to gradually shift throughout the engines design life (e.g. 1 million miles). These correspond to long-term models that can cause a gradual shift in emissions. Inclusion of embedded models for the critical components or sub-systems that affect emissions from the engine can provide a better understanding and prediction of the long-term emissions trends observed at the system-out (714) for an engine-aftertreatment system. This is because of the interaction between engine-out degradation and SCR catalyst system degradation.

As can be noted, in the model 800, the blocks 710 and 712 are coupled to receive inputs from the combined degradation estimate based SCR catalyst plant model 814, which is sensitive or responsive to the SCR catalyst temperature 801 and fuel flow 803, and the temperature sensor signal at SCR catalyst 805 via the short-term cumulative degradation model 808 and the long-term cumulative degradation model 810. As such, the reaction of $NO_x$ at the block 710 and the oxidation of ammonia at the block 712 happens in response to the noise factors defined by the signals 801, 803, and 805.

Furthermore, the $NO_x$ transportation module 718 is also coupled to receive inputs from the fuel system degradation model block 802, the turbocharger degradation model block 804, and the power cylinder degradation model block 806 via the module 716.

As such, contrary to the existing type of model 700 in FIG. 7, the model 800 takes into consideration and calculation the noise factors or real time data; making it more robust and practical for the purposes of use in manufacturing plants.

Figure 9:
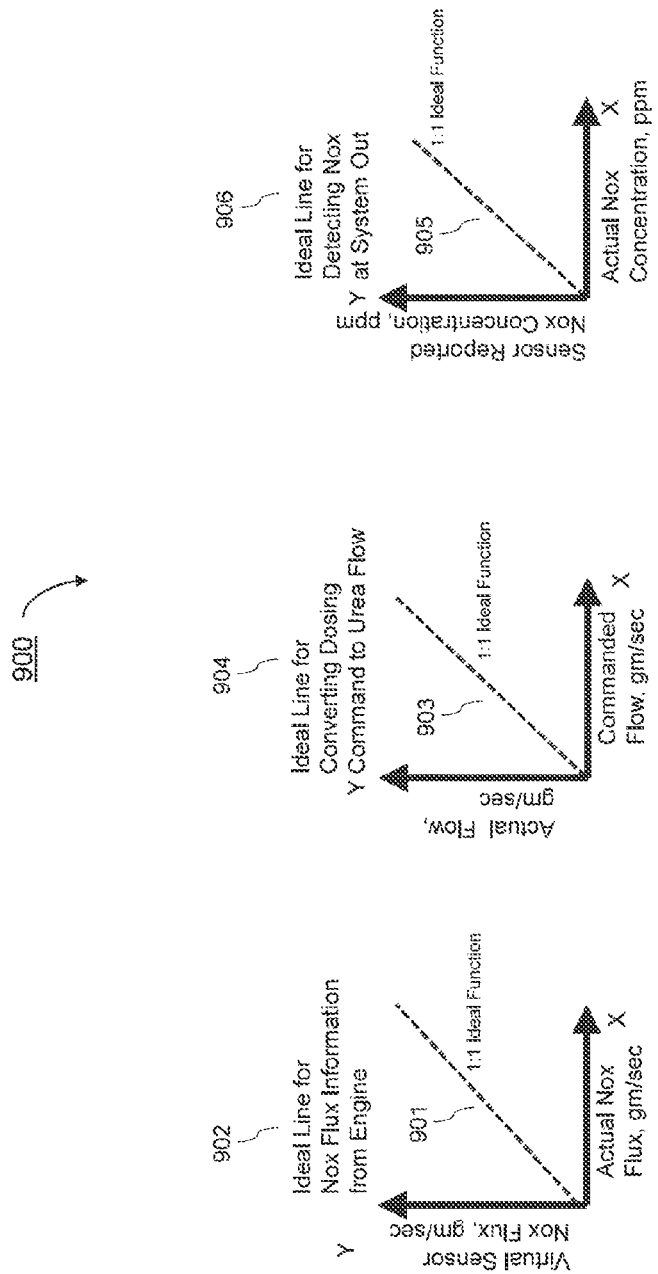
FIG. 9 is a graphical illustration of example functions and a $NO_x$ system model that can be applied in the physics based degradation model, according to an embodiment.

FIG. 9 is a graphical illustration 900 of example functions and a $NO_x$ system model that can be applied in the cumulative degradation model 800, according to an embodiment. FIG. 9 includes plots 902, 904, and 906. The plot 902 illustrates a linear function of actual $NO_x$ flux in grams per second versus virtual sensor $NO_x$ flux in grams per second and an ideal line 901 for $NO_x$ flux information from the engine. The graph 904 illustrates an ideal linear function of commanded Urea flow in grams per second versus an actual flow in grams per second and an ideal line 903 for converting dosing command to Urea flow. The graph 906 illustrates a linear function of an actual $NO_x$ concentration parts per million versus sensor reported $NO_x$ concentration in parts per million and an ideal line 905 for detecting $NO_x$ at system out.

The plots 902, 904, and 906 correspond to the modules 702, 706, and 714 respectively. These are the critical actuators and sensors in the system that effectively drive $NO_x$ control (using the chemical reactions in the SCR catalyst elements as shown in modules 718, 720, 708, 722, 710, 712; and the control algorithms in the ECM as shown in the module 704). FIG. 9 provides a robust design approach, which includes an assessment of signal-to-noise ratio of the sensors, SCR catalyst elements and actuators in the new states as well as in the degraded state. This signal-to-noise ratio can also incorporate additional noise factors such as part-to-part variation and application/design variant/duty-cycle variation that can affect $NO_x$ emissions performance.

Figure 10:
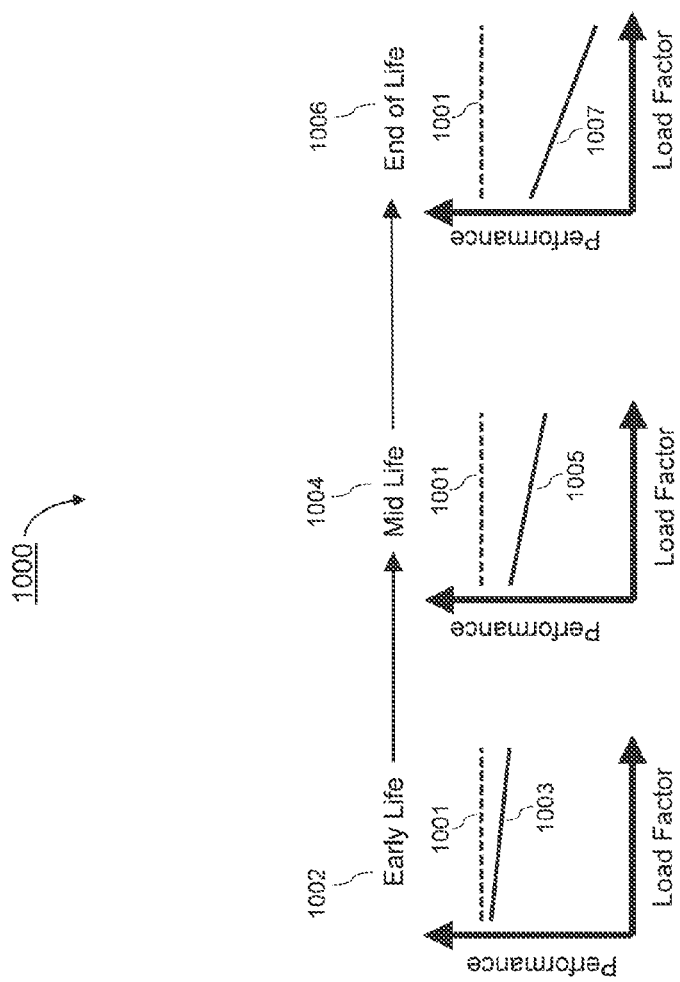
FIG. 10 is a graphical illustration of example characterizations based on population of vehicles that can be used for the physics based degradation model, according to an embodiment.

FIG. 10 is a graphical illustration of example characterizations of components and sub-system degradation rate based on sub-population using life groups of vehicles, which can be used for the cumulative damage model 800, according to an embodiment. The characterizations are based on hundreds and thousands of trucks. The data can be used from other vehicles as well. As shown, the vehicle data is arranged in three categories early life shown by a plot 1002, mid-life shown by a plot 1004, and end of life shown by a plot 1006. The plots 1002, 1004, and 1006 represent load factor versus performance. The dotted line 1001 represents an ideal performance and the lines 1003, 1005, and 1007 represent the actual performance of the vehicles.

FIG. 10 shows how data can be processed and interpreted by data analytics to interpret $NO_x$ emissions performance (or $NO_x$ reduction) as a function of component/sub-system operating condition. An example of a load factor for a SCR catalyst component could be space velocity. In one example, cumulative damage models (within the ECM) can be adjusted based on the information passed by telematics from data analytics. It may be noted that the difference between 1001 and 1003 in the plot 1002 is quite small and difficult to measure, but the difference between 1001 and 1007 in the plot 1006 is quite large and easier to measure. Additionally, the slope of the line 1007 is significantly greater than the line 1003. It may be thus appreciated that the early life, the mid-life, and the end of life stages would correspond to increasing levels of cumulative damages simulated by the short-term and the long-term models 808 and 810.

Another embodiment is to use the trend-lines (slope) and variation (standard error of intercept) observed using machine learning in conjunction with physics-based degradation rules to interpret evidence of wear-out events (Weibull, Bathtub Curve) over long periods of time in a vehicle or sub-population (sub-clusters) including geographic location and ambient conditions (dust, fuel-borne chemical contaminants: S, air-borne chemical contaminants: Na, S, etc.) to enable preventative maintenance event schedules and/or the use of premium component designs (unique service parts) to optimize life cycle costs. This would involve the characterizations of populations of degradation rates during early life, mid-life, and late life as shown in FIG. 5.

Figure 11:
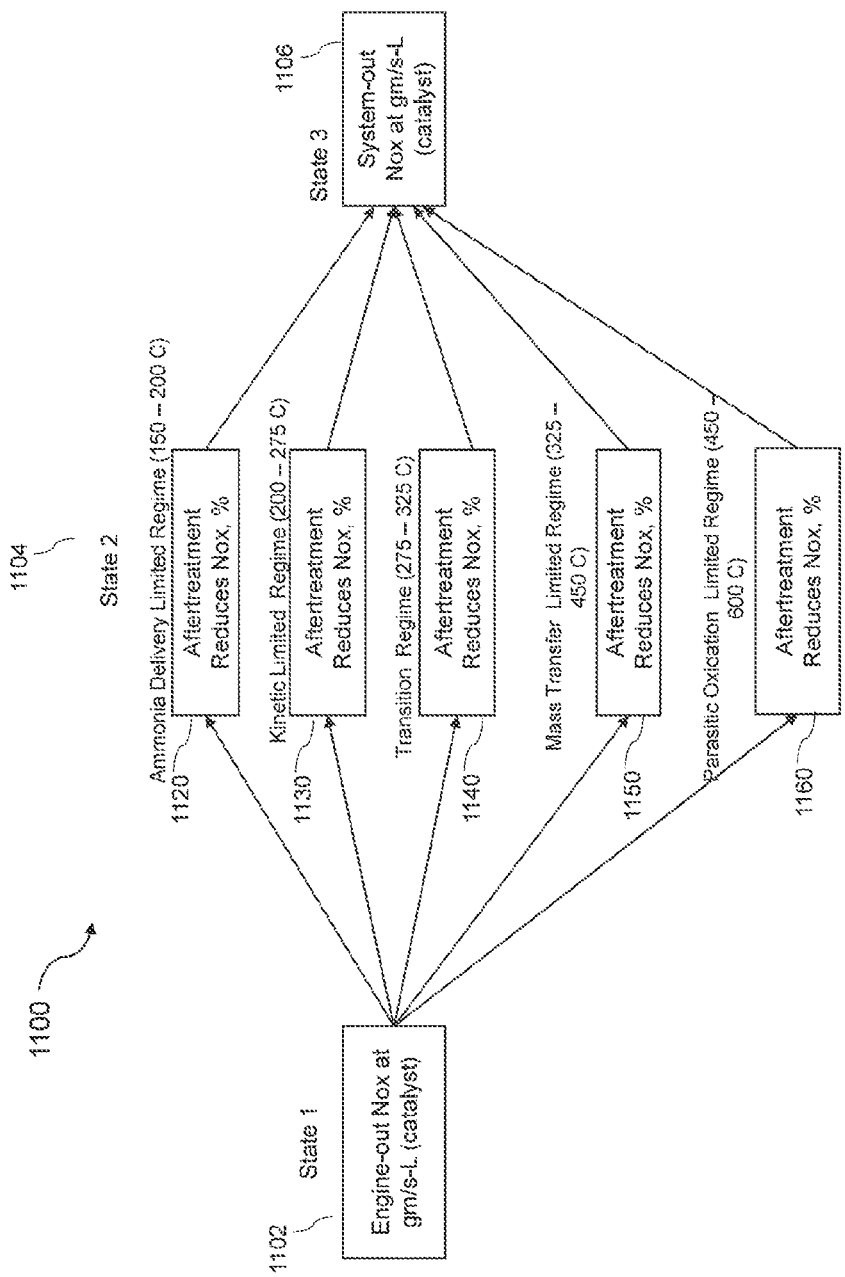
FIG. 11 illustrates an example state machine model for detection of the SCR catalyst reduction, according to an embodiment of the present disclosure.

FIG. 11 illustrates an example of a state machine model 1100 that can be used as part of the cumulative damage model, according to an embodiment of the present disclosure. As can be seen, the model 1100 includes states namely a state_1 1102, a state_2 1104, and a state_3 1106. In the state_1 1102, the engine out $NO_x$ is measured. In state_2, a percent reduction of $NO_x$ can be measured, and in the state_3 1106, the engine out $NO_x$ is measured again. In this existing type of state machine model, the state_2 is the same for different aftertreatment regimes including ammonia delivery limited regime (suitable for temperatures 150-200 C), kinetic limited regime (suitable for temperatures 200-275 C), Transition Regime (suitable for temperatures 275-325 C), mass transfer limited regime (suitable for temperatures 325-450 C), and parasitic oxidation limited regime (suitable for temperatures 450-600 C).

As may be appreciated by those skilled in the art, the temperatures listed in for the regimes above refer to the exhaust temperature derived from a physical sensor or a model-based virtual sensor for the SCR catalyst. For example, DEF is very difficult to decompose to ammonia in the range of 130 to 200 degrees Celsius exhaust temperatures, therefore, the $NO_x$ reduction of the aftertreatment system is limited by the ammonia delivery (e.g. DEF decomposition in the exhaust). The existing type of state machine model 1100 does not take into consideration the details of different regimes.

Figure 12:
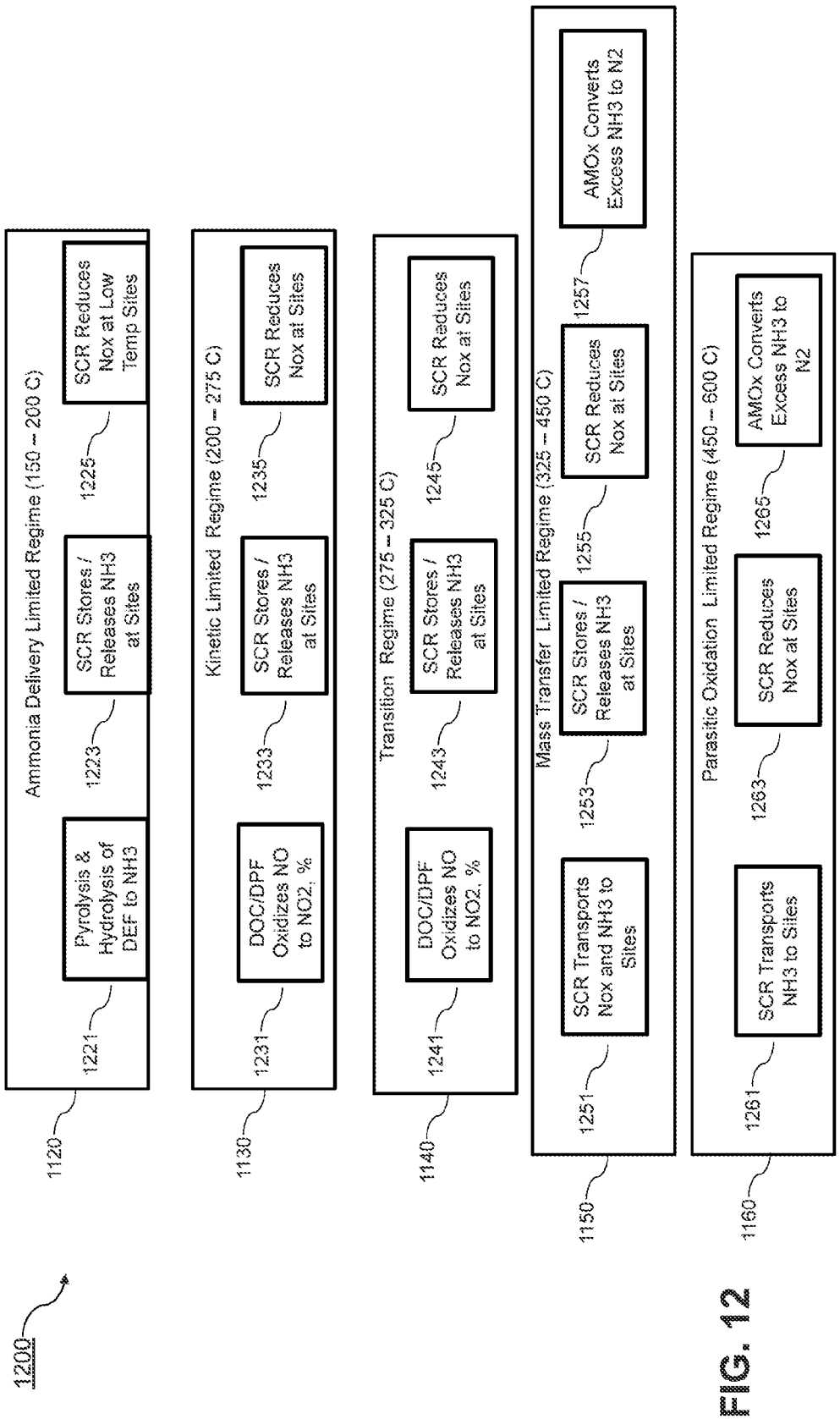
FIG. 12 illustrates an example block diagram of reliability data for various SCR catalyst architectures and aftertreatment system regimes, according to chemical engineering facts.

FIG. 12 illustrates an example of a reliability data block diagram model 1200 based on the reliability data for various SCR catalyst architectures and aftertreatment system regimes, according to chemical engineering facts. Referring back to FIG. 8A, the reliability data can be used with the equation (11) to calculate a combined degradation estimate of the SCR catalyst. For example, as shown the ammonia delivery limited regime (150-200 C) may be understood to include a process 1221 where pyrolysis and hydrolysis of DEF to $NH_3$ takes place, a process 1223 where SCR stores/releases $NH_3$ at Sites, and a process 1225 where SCR reduces $NO_x$ at low temp sites.

The kinetic limited regime (200-275 C) may be understood to include a process 1231 where a percentage of DOC/DPF oxidizes NO to $NO_2$, a process 1233 where SCR stores/releases $NH_3$ at sites, and a process 1235 SCR reduces $NO_x$ at sites.

Transition Regime (275-325 C) may be understood to include a process 1241 where a percentage of DOC/DPF oxidizes NO to $NO_2$, a process 1243 where SCR stores/releases $NH_3$ at sites, and a process 1245 SCR reduces $NO_x$ at sites.

The mass transfer limited regime (325-450 C) may be understood to include a process 1251 where SCR transports $NO_x$ and $NH_3$ to sites; a process 1253 where SCR stores/releases $NH_3$ at sites; a process 1255 where SCR reduces $NO_x$ at sites; and a process 1257 where $AMO_x$ converts excess $NH_3$ to $N_2$.

The parasitic oxidation limited regime (450-600 C) may be understood to include a process 1261 where SCR transports $NH_3$ to sites; a process 1263 where SCR reduces $NO_x$ at sites; and a process 1265 where AMOx converts excess $NH_3$ to $N_2$.

This reliability data can be combined with the state machine model 1100 the details of which will be explained with respect to FIG. 13.

Figure 13:
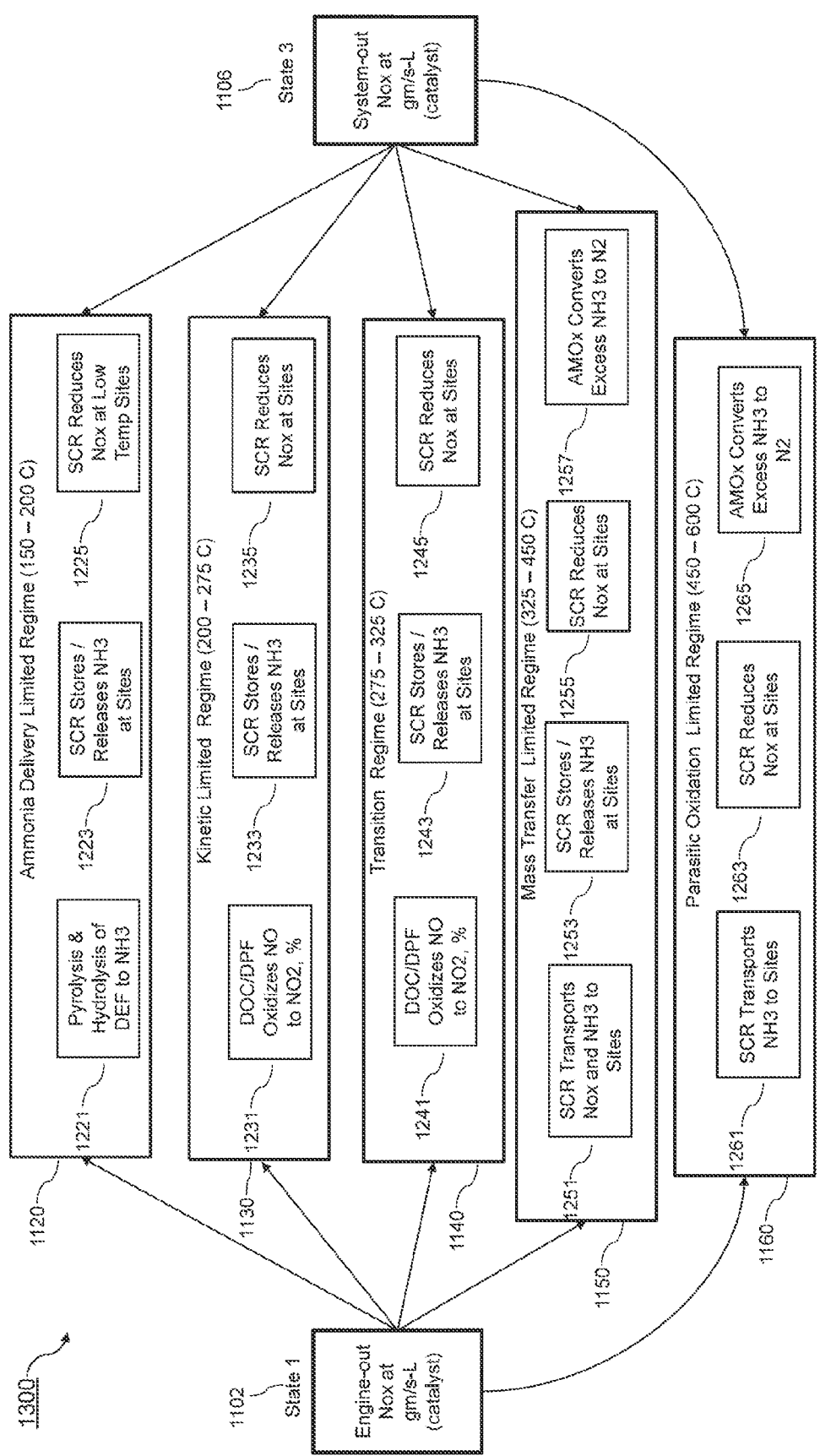
FIG. 13 illustrates an example architecture based system model for detecting SCR catalyst degradation, according to an embodiment.

FIG. 13 illustrates an example architecture based system model 1300 for detection of catalytic degradation, according to an embodiment. The model 1300 is a combination of the state machine model 1100 and the reliability data block diagram. In other words, the model 1300 is a modified state machine model, which can be used as part of the cumulative damage model. As can be seen the state 2 of the model 1300, includes specific states related to the reliability data for each aftertreatment regime. Referring to kinetic limited regime, for it may be understood that in order to reduce $NO_x$ at 200-275 degrees Celsius, the DOC oxidizes NO to $NO_2$ and SCR stores and release $NH_3$, and SCR reduces $NO_x$. From this it can be concluded that thermal degradation of DOC and thermal and/or chemical degradation of SCR is additive.

It may be noted from the FIGS. 11, 12, and 13 that in general the SCR catalyst component degradation models can be combined based on the aftertreatment architecture to form a system degradation model. The structure of this architecture-based system model 1300 is a combination of the reliability block diagram model 1200 and a state machine model 1100 based engine-out exhaust vector (e.g. turbine outlet temperature). The engine-out vector represents or refers to the combined exhaust flow rate, exhaust temperature, and exhaust emissions-species concentrations (oxygen, $NO_x$, hydrocarbon, CO, particulate, etc.).

Figure 14:
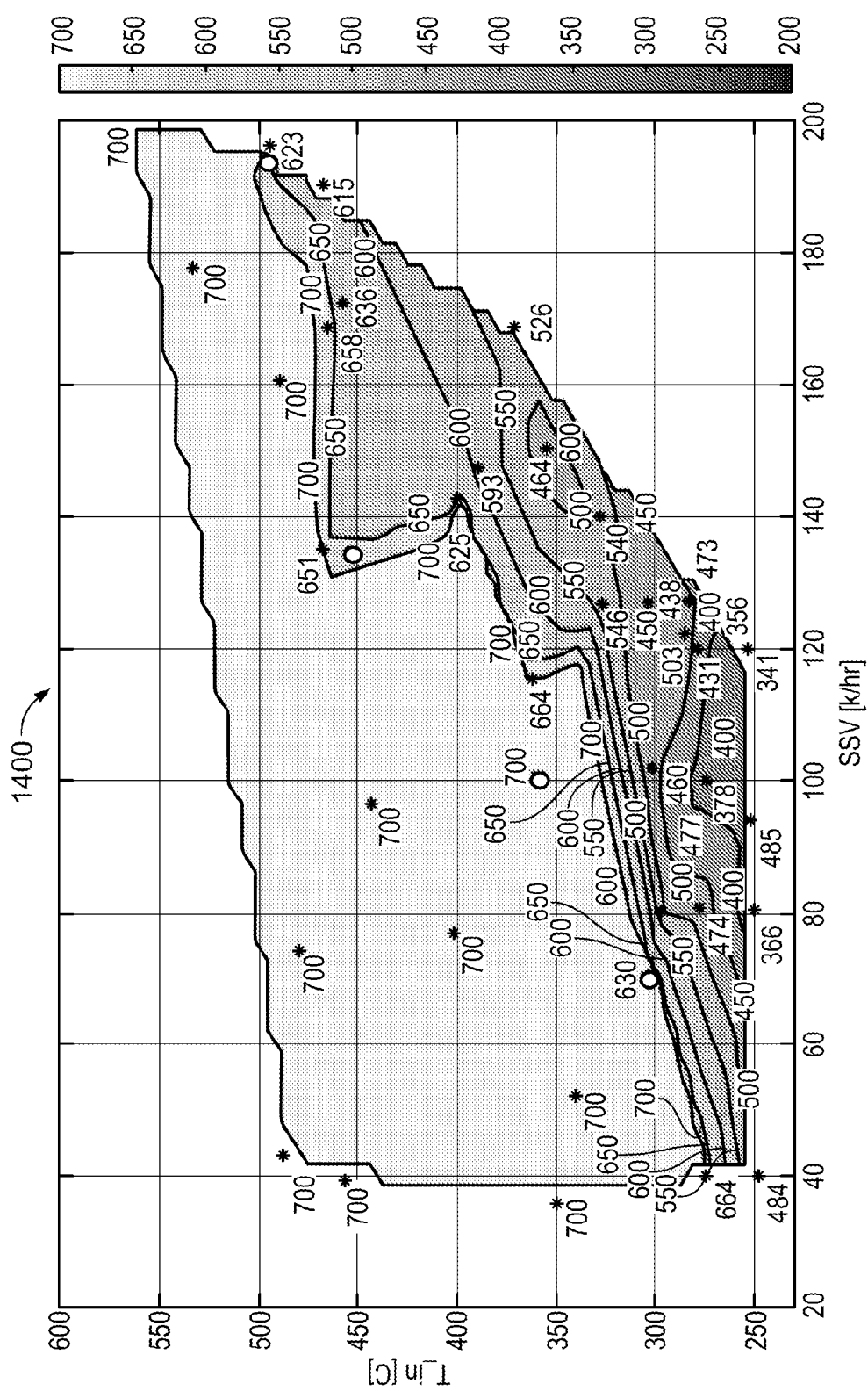
FIG. 14 illustrates a graph of experimental data of a DOC catalyst outlet temperature as a function of catalyst inlet exhaust temperature (T_In) and exhaust flow space velocity (SSV).

FIG. 14 illustrates a graph of experimental data of a SCR catalyst outlet temperature. More particularly the data shown is for a diesel oxidation SCR catalyst (DOC). The graph 1400 illustrates DOC outlet temperature capability with 2500-ppm hydrocarbon (HC) slip-limit. Shown on x-axis and y-axis are space velocity SSV (k/hr) and temperature in degrees Celsius respectively. The SCR catalyst region pointed to by 1402, is the operating zone controlled by chemical kinetics, the zone changes with aging and/or degradation.

Figure 15:
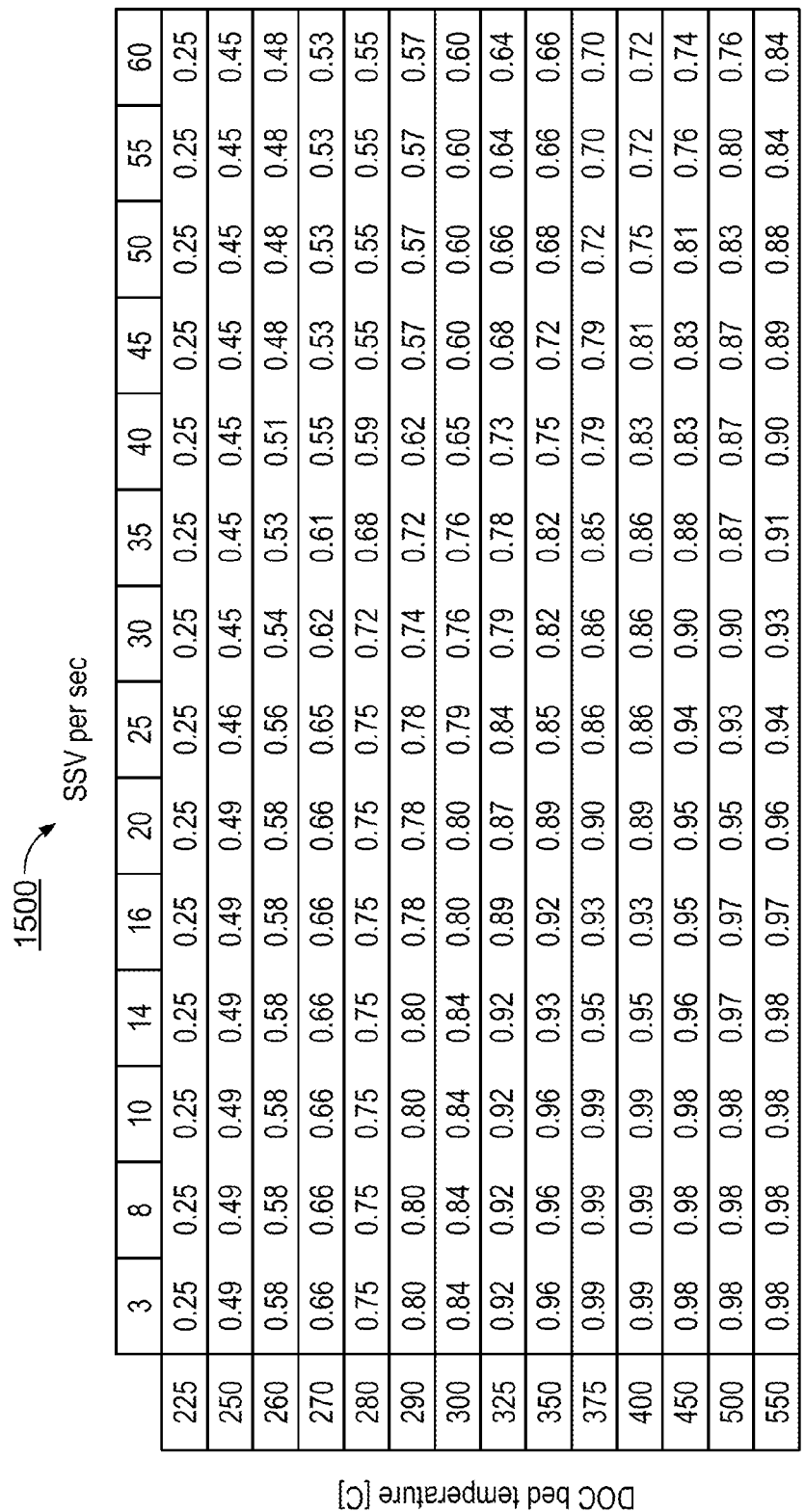
FIG. 15 illustrates a calibration table for an aged diesel oxidation catalyst (DOC) shown in FIG. 14, showing hydrocarbons conversion efficiency.

FIG. 15 illustrates a calibration table for an aged DOC shown in FIG. 14, showing hydrocarbons conversion efficiency. In one example, the cumulative damage model can be used for the upstream SCR catalyst elements (e.g. diesel oxidation catalyst elements) to 'de-rate' the hydrocarbon dosing commands during an active regeneration on a highly-aged DOC in order to prevent or avoid any progressive damage to the downstream SCR catalyst elements. An approach to this would be to adjust the DOC thermal experimental data of FIG. 14 or HC conversion efficiency table of FIG. 15 i.e. efficiency vs temperature and space velocity. As can be appreciated from the table of FIG. 15, the interpolation of DOC dosing commands table will be non-linear with aging in order to mimic the physics-based response for hydrocarbon conversion with normalized efficiency.

The data in the table 1500 is related to the hydrocarbon dosing commands and is an example of one of the calibration tables such as slip-limit tables block shown later in FIG. 16 for a temperature controller. An over-simplified illustration to understand the table 1500 would be to pick a value in the table (e.g. 0.25), multiply that by the value of a signal 1621 in FIG. 16 to determine the value of a signal 1615. A controls software algorithm as shown in module 704 however would be much more complex than this over-simplified illustration using a multiplication. The data in the table is a stored ammonia slip data corresponding to ammonia slip through the SCR catalyst relative to a SCR catalyst temperature.

In one example, the ammonia slip data may be stored in a lookup table within the controller 128 in a memory or can be stored on an external memory device. The controller 128 can be configured to modify stored ammonia slip data and further adjust the amount of reductant inserted into the aftertreatment system based on the modified stored ammonia slip data.

Figure 16:
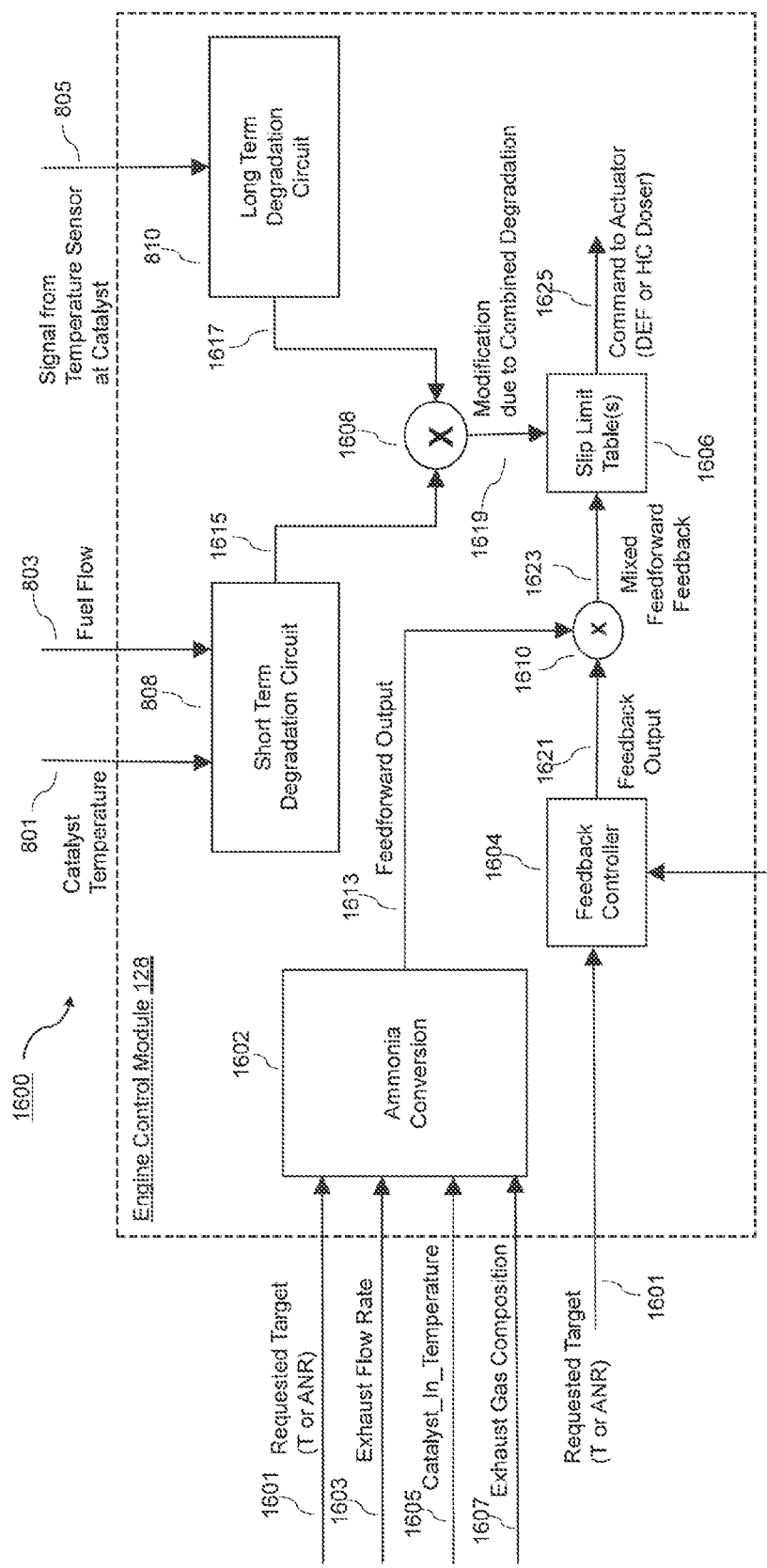
FIG. 16 illustrates an example implementation of an integration of the physics based degradation model, according to an embodiment.

FIG. 16 illustrates an example implementation 1600 of an integration of the physics based degradation models, also referred to as cumulative damage models as shown in FIG. 8A with conventional feedforward (FF) and feedback (FB) controllers, according to an embodiment. FIG. 16 illustrates a feedforward (FF) controller 1602, a feedback (FB) controller 1604, a slip-limit tables block 1606, a first signal mixer 1608, a second signal mixer 1610, a short-term cumulative degradation model 808, and a long-term cumulative degradation model 810. As shown, in the example implementation 1600, the short-term model 808 and the long-term model 810 can be part of the ECM 128. In other examples, those can be discrete.

The FF controller 1602 and the FB controller 1604 may form a conventional type of model along with the slip-limit tables block 1606. The FF controller 1602 is coupled to receive a requested target signal 1601, an exhaust flow rate signal 1603, a catalyst_in_temperature signal 1605, and an exhaust gas composition signal 1607. The requested target signal 1601 in one example can be temperature (T) or ammonia to $NO_x$ ratio (ANR). The exhaust gas composition signal 1607 may include $NO_x$, $O_2$ etc. The FB controller 1604, which in one example can be a PID controller, is coupled to receive the requested target signal 1601 and a signal 1611 from downstream sensor of the SCR catalyst.

An output signal 1613 of the FF controller 1602 may also be referred to as a feedforward output signal 1613, and an output signal 1621 of the FB controller 1604, may also be referred to as a feedback output signal 1621. Both the signals feedforward output signal 1613 and the feedback output signal 1621 are further mixed via the second signal mixer 1610 to generate a mixed feedforward feedback signal 1623, which is further provided to the slip-limit tables block 1606. The slip-limit tables block 1606, which can include a single slip-limit table or a plurality of slip-limit tables, is further coupled to output a command to actuator signal 1625 which in one example, may control or adjust the amounts of diesel exhaust fluid or HC doser. Referring briefly back to FIG. 1, the command to actuator signal 1625 in one example can be provided to the controller 128.

The short-term cumulative degradation model 808 is coupled to receive the signals or parameters SCR catalyst temperature 801 and fuel flow 803. The long-term cumulative degradation model 810 is coupled to receive the signal 805 from a temperature sensor at SCR catalyst. In one example, the SCR catalyst may have a plurality of temperature sensors and the signal 805 may be a collective or average temperature from all the sensors. An output signal 1615 from the short-term cumulative degradation model 808 and an output signal 1617 from the long-term cumulative degradation model 810 are mixed by the first signal mixer 1608. The first signal mixer 1608 is further coupled to generate a modification signal 1619 based on the signals 1615 and 1617; and provide it to the slip-limit tables. It may be appreciated that the modification signal 1619 is based on the combined degradation and the slip-limit tables may be modified based on that. In one example, the slip-limit tables may include limits to the amounts of ammonia slips.

As can be appreciated, in a conventional model configuration, the slip-limit tables block 1606 generates the command to actuator signal 1625 substantially based on the FF controller 1602 and the FB controller 1604.

However, with the integration of the short-term cumulative degradation model 808 and the long-term cumulative degradation model 810 with the conventional model, provides an option to use the combined information from both the models 808 and 810 to provide inputs to the controller 128. The controller may use this combined information for active regeneration or hydrocarbon control or $NO_x$ control in SCR catalysts. The short-term cumulative degradation model 808 in one example can also be a reversible model.

It should be noted that the catalyst_in_temperature signal 1605 refers to the exhaust gas temperature measured at or near the SCR catalyst inlet face. In one example, the catalyst_in_temperature signal 1605 may be derived from a physical temperature sensor in the exhaust. In another example, it can be derived from a virtual sensor, which uses other temperature sensors in the aftertreatment and a simple embedded model to estimate the exhaust temperature at the SCR catalyst inlet face. Referring back to FIG. 1, it corresponds to temperature sensor 118 upstream of the oxidation SCR catalyst 108 or the particulate filter 114. As such in one embodiment, it can be similar to the signal 801.

As explained earlier with respect to FIG. 8A, these temperatures are measured in the exhaust stream upstream and downstream of the SCR catalyst 108 or the particulate filter 114 shown in FIG. 1. The virtual internal temperature sensors are predicted (using an embedded heat-transfer/thermodynamic software model in the ECM) inside the cylindrical SCR catalyst element at one or more axial and radial positions inside the SCR catalyst element.

The implementation 1600 can be used for two different actuators: [1] For a temperature controller (such as one used with a diesel oxidation catalyst), or [2] for an SCR controller. In the example of a temperature controller, the requested target signal 1601 can be the desired i.e. exhaust gas temperature at the outlet of the SCR catalyst. The temperature controller (control algorithm) uses the exhaust gas temperature and mass flow rate at the inlet of the SCR catalyst to determine how much energy (as hydrocarbon, fuel injection, or electric heater) to add to the exhaust stream (via external HC dosing on in-cylinder dosing) to achieve the requested target temperature in the exhaust gas, including constraints to minimize undesired unburned hydrocarbon slip, at the outlet of the oxidation catalyst.

In the example of an SCR controller (such as module 706 used to control a Urea/DEF metering injector), the requested target ANR can be the desired (i.e. requested target) ammonia-to-$NO_x$ ratio in the exhaust gas at the outlet of the SCR catalyst. In one embodiment implementation 1600 may be interpreted to mean that the SCR controller or the control algorithm uses the exhaust gas temperature, composition ($NO_x$ concentration, oxygen concentration), and mass flow rate upstream of the inlet face of the SCR catalyst to determine how much reductant (as DEF, urea, or gaseous ammonia) to add to the exhaust stream (via urea/DEF metering injector) to achieve the desired $NO_x$ reduction, including constraints to minimize undesired ammonia slip, at the outlet of the SCR catalyst.

In one example, the FF controller 1602 and FB controller 1604 may represent software algorithms that operate within the ECM along with some companion software algorithms that are used to control the engine fuel system, turbocharger, exhaust gas recirculation valve, intake and/or exhaust throttle, etc. Furthermore, the controller software algorithms can be implemented within/integrated with the controller 128. Additionally, there can also be a second control module, dedicated to aftertreatment control, that we call an aftertreatment control module (ACM) in the aftertreatment system 100.

Referring back to FIG. 1, it may be noted that in general, the implementation 1600 may be used for aftertreatment systems which have the $NO_x$ sensor 116 placed in the exhaust gas upstream of SCR catalyst 108.

Furthermore, if the implementation 1600 is for an SCR controller, then the signal 1611 would refer to the $NO_x$ sensor 112 but it could also use other sensors such as a mid-bed $NH_3$ sensor downstream $NH_3$ sensor, or other sensor systems. If the implementation were for a temperature controller used with an oxidation SCR catalyst, then signal 1611 would refer to the downstream temperature sensor 120.

Referring briefly back to FIG. 15, the data in the table 1500 is related to the hydrocarbon dosing commands and is an example of one of the calibration tables such as the slip-limit tables block 1606 for a temperature controller. As will be explained later in the specification, a value in the table 1500 (e.g., 0.25), can be multiplied by a value of a signal in FIG. 16 to determine a value of another signal that can provide a command to an actuator. A controls software algorithm as shown in module 704 however would be much more complex than this over-simplified illustration using a multiplication. Additionally, as mentioned earlier with respect to FIG. 15, the short-term model 808 and the long-term model 810 are configured to modify the stored ammonia slip data. It may be noted that in one example, the stored ammonia slip data may include to the data stored in the ECM for the ammonia slip limit tables and may be different from the ammonia storage capacity of the SCR catalyst coating. The FF controller 1602 and the FB controller 1604 may also be configured to modify the stored ammonia slip data in response a target value of a SCR catalyst temperature of the SCR catalyst or an ammonia to $NO_x$ ratio as indicated by the signal 1601, an exhaust flow rate as indicated by the exhaust flow rate signal 1603, a SCR catalyst inlet temperature at an inlet of the SCR catalyst as indicated by the signal SCR catalyst_in_temperature 1605, an exhaust gas composition as indicated by the exhaust gas composition signal 1607.

Figure 17:
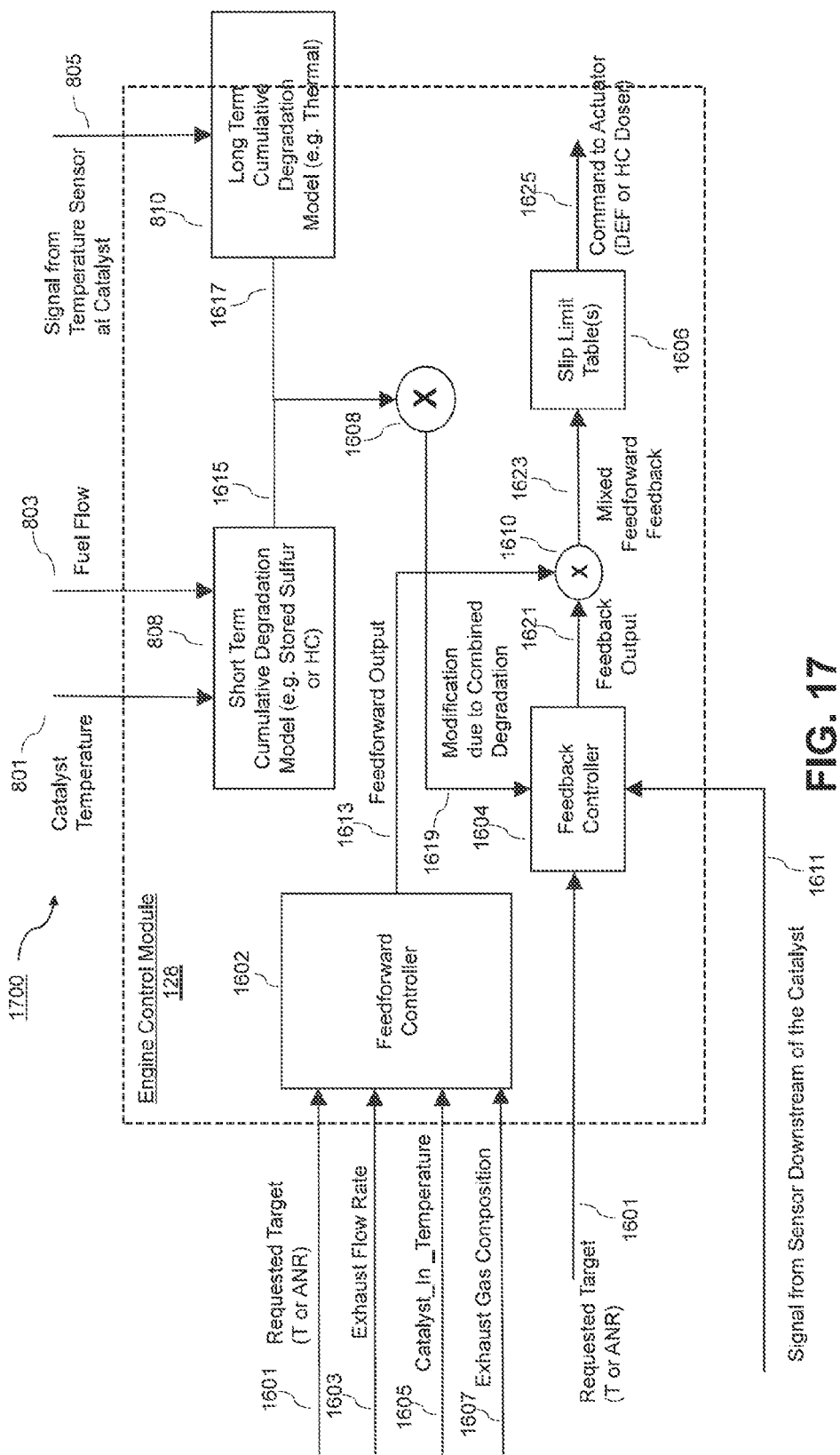
FIG. 17 illustrates another example implementation of an integration of the physics based degradation model, according to an embodiment.

FIG. 17 illustrates another example implementation 1700 of an integration of the physics based degradation models as shown in FIG. 8A with conventional feedforward (FF) and feedback (FB) controllers, according to an embodiment. The implementation 1700 shares many common blocks and signals with the implementation 1600.

A way in which the implementation 1700 differs from 1600 is that the modification due to combined degradation signal 1619 is provided to the FB controller 1604, which modifies the target T or ANR value, which may provide a de-rate feature, i.e., making sure that the SCR catalyst is operating below its maximum operating ratings.

As may be appreciated by those skilled in the art that in existing type of models, particularly for diesel engines, regeneration vector target tables for a DOC outlet or DOC slip control tables are used independently. Additionally integral windup is also a common problem with systems using the PID controllers.

However, the implementation 1700 allows the de-rate feature to be used to adjust the regeneration vector target tables for a DOC outlet in parallel with a DOC slip control table in order to overcome the integrator wind-up problem.

Figure 18:
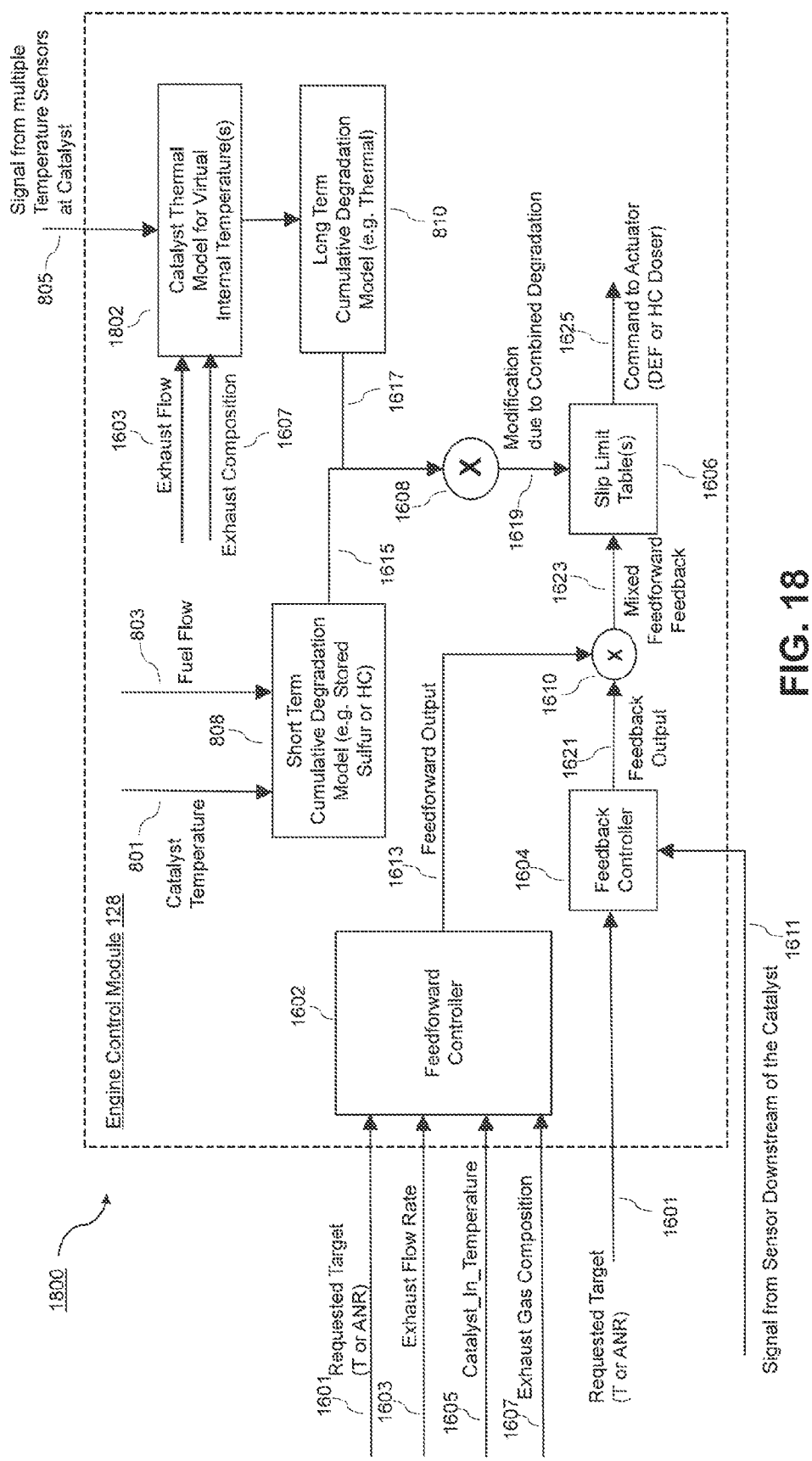
FIG. 18 illustrates still another example implementation of an integration of the physics based degradation model, according to an embodiment.

FIG. 18 illustrates another example implementation 1800 of an integration of the physics based degradation models as shown in FIG. 8A with conventional feedforward (FF) and feedback (FB) controllers, according to an embodiment. The implementation 1800 shares many common blocks and signals with the implementation 1600.

Additionally, the implementation 1800 includes a SCR or DOC catalyst bed temperature thermal model, also referred to as a catalyst thermal model for virtual internal temperature(s) 1802 as an input to the long-term cumulative damage model for the SCR catalyst coating. The model 1802 is coupled to receive a plurality of parameters including an exhaust flow rate indicated by the exhaust flow rate signal 1603, the exhaust gas composition signal 1607, and the signal 805 from multiple temperature sensors at SCR or DOC catalyst. In other examples, there can be a single temperature sensor. A software logic may be used to switch between T(inlet) and T(outlet) as the dominant input to the thermal model depending on whether the DOC catalyst element was experiencing an exothermic reaction (as determined by T(inlet) and T(outlet)), which correspond to temperature sensors 118 and 120, respectively as shown in FIG. 1 and are measured in the exhaust stream upstream and downstream of the oxidation catalyst (or diesel particulate filter); the virtual internal temperature(s) are predicted (using an embedded heat-transfer/thermodynamic software model in the ECM) inside the cylindrical SCR or DOC catalyst element at one or more axial and radial positions inside the SCR or DOC catalyst element.

Figure 19:
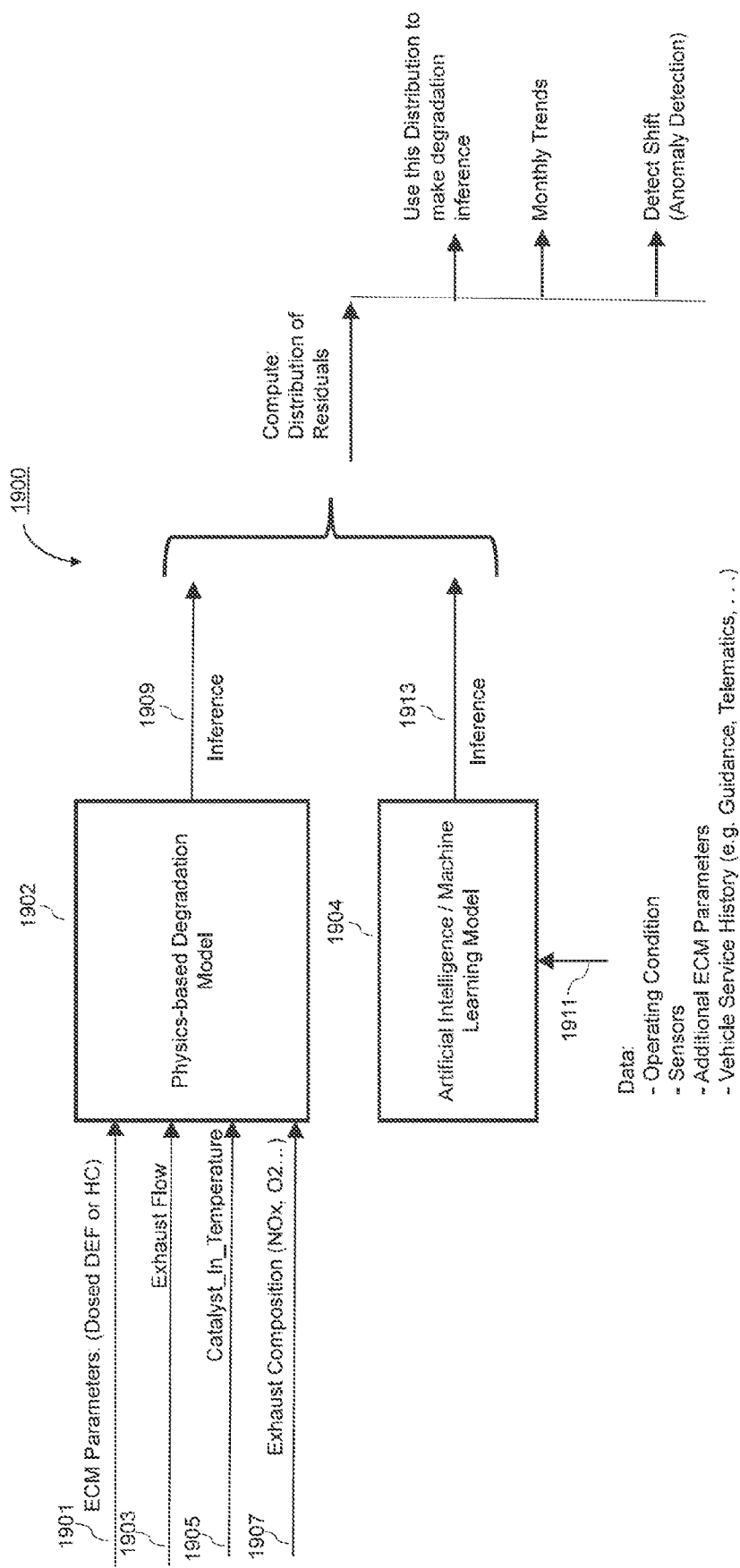
FIG. 19 illustrates an example implementation of an integration of the physics based degradation model with a machine-learning model, according to an embodiment.

FIG. 19 illustrates an example implementation 1900 of an integration of the physics based degradation model with a machine-learning model, according to an embodiment. The implementation includes a physics based degradation model 1902 and an artificial intelligence (AI) based machine learning (ML) model 1904. The model 1902 can be one example of the short-term cumulative degradation model 808 or long-term cumulative degradation model 810 or a combination thereof. The model 1902 can also be integrated with PID controllers as shown in FIG. 16 or FIG. 17.

Figure 20:
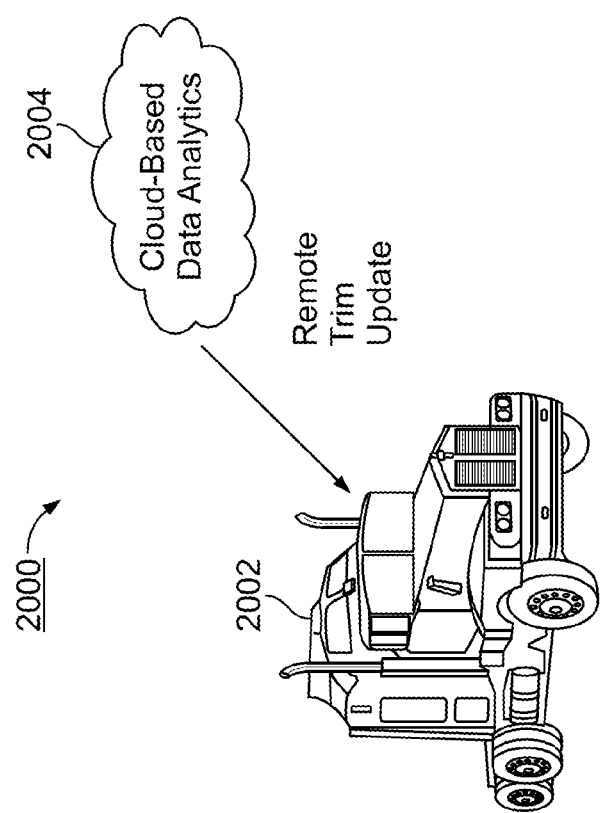
FIG. 20 illustrates an example implementation of using cloud based data analytics for getting updates from a vehicle, according to an embodiment.

The model 1902 is coupled to receive an ECM parameter such as dosed DEF or HC 1901, and parameters or signals including exhaust flow rate 1903, SCR catalyst temperature 1805, and exhaust gas composition 1907. In one example, the SCR catalyst temperature 1905 can be an internal temperature of the SCR catalyst. In other examples, it can be an external temperature of the SCR catalyst as well. The model 1902 is further coupled to output an inference 1909. The AI based ML model 1904 is coupled to receive data 1911 which in one example can include operating condition, sensors, additional ECM parameters, vehicle service history e.g. guidance, telematics, etc. The AI based ML model 1904 is further coupled to output an inference 1913. As can be appreciated by those skilled in the art, the inferences 1909 and 1913 are statistical results. In one example, the inference 1913 made by the AI based ML model 1904 can be applied to the physics based model 1902 to compare the distribution of residuals and use this distribution to make an inference about degradation. This approach also detects shifts in system performance such as anomaly detection within an individual vehicle or a sub-population of vehicles. FIG. 20 illustrates an example implementation of using cloud based data analytics for getting updates from a vehicle, according to an embodiment. As shown a vehicle 2002 can be configured to receive remote trim updates from a cloud network or a remote server 2004 about duty-cycle, geography, environment (e.g. noise factors) to ensure emissions compliance and avoid false positives such as fault code based on static limitations (altitude, humidity, ambient temperature) and information from the sub-population in that region could be utilized to take preventive measures. For example, time between timer-base active regenerations or ANR to accommodate noise factors and avoid unnecessary repair events, vehicle downtime including false on-board diagnostics faults.

Figure 21:
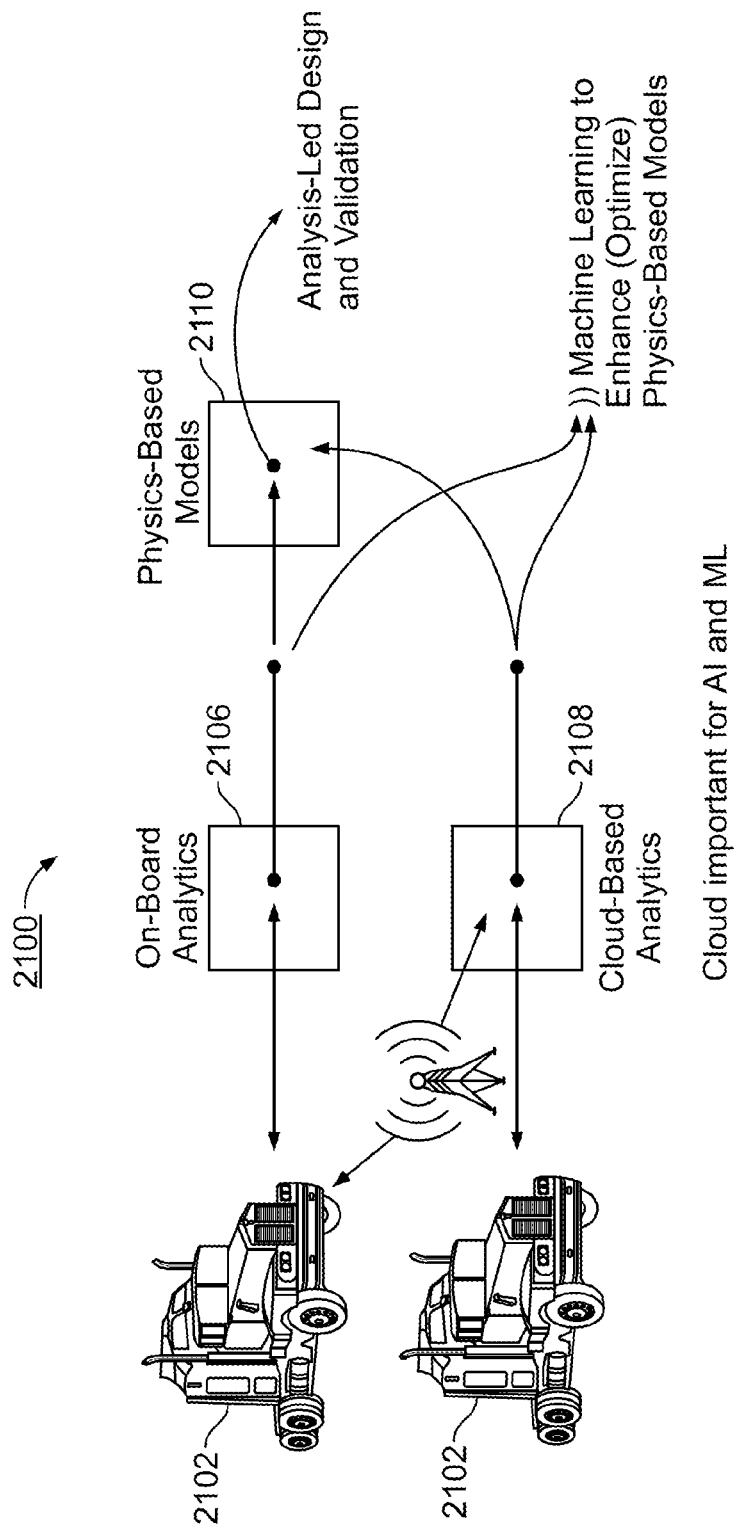
FIG. 21 illustrates an example implementation of integration of on-board analytics and cloud based analytics with the physics based degradation model, according to an embodiment.

FIG. 21 illustrates an example implementation 2100 of integration of on-board analytics and cloud based analytics with the physics based cumulative damage model, according to an embodiment. FIG. 2 includes a vehicle 2102 having an on-board analytics module 2106 and configured to interact with a cloud-based analytics module 2108; both of which can configured to further interact with physics based models 2110 which in turn can provide an analysis led design and validation. Furthermore, modules 2106 or 2108 can further be integrated with machine learning to enhance the physics based model. In one example, real-time vehicle usage patterns vs. the defined application (via clustering analysis) can be used as an enhancement for physics-based model. The usage patterns can then be observed for individual vehicles. For example in case of a line-haul vehicle such as a truck may be shifted temporarily to a pick-up and delivery driving cycle which may allow machine learning and enhance physics-based model to make adjustments to the engine/aftertreatment calibration using over-the-air (OTA) calibration adjustments.

Figure 22:
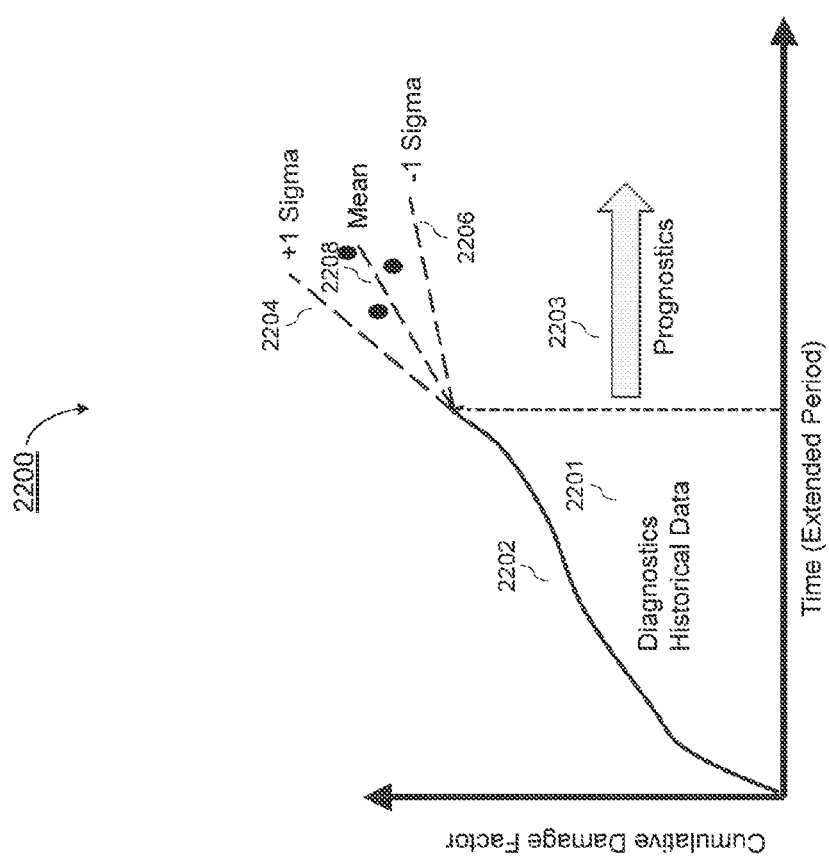
FIG. 22 is a graphical illustration of an example of application of prognostics with machine learning, according to an embodiment.

FIG. 22 is a graphical illustration of an example of application of prognostics with machine learning to extend cumulative damage factor into future times, according to an embodiment. FIG. 22 includes a graph 2200 of cumulative damage factor versus time. A plot 2202 in the graph 2200 can represent sample data from service performance test for a single vehicle. A region 2201 represents the diagnostics historical data where as a region 2203 represents prognostics region. The data from the region 2201 can be used to extend or extrapolate the cumulative damage factor into future. For example, from a cluster of data shown, the plot 2202 can be extended as either line 2204, line 2206, or line 2208, where 2208 is a mean of the line 2204 and the line 2206.

As such, the data from the graph 2200 can be used as prognostics using machine learning. The use of sample data from service performance tests performed on other vehicles and/or machines within a population helps improve the reliability of the extrapolation of the cumulative damage function or factors for that particular single vehicle. This could be further enhanced by the use of the histograms that are reduced from time-domain exhaust temperature data and exhaust mass flow data (that are comparable to the time constant of the combined degradation estimate based SCR catalyst plant model 814 shown in FIG. 8A) and can allow a more efficient data transfer from the machine to the cloud-based data analytics. This approach has a benefit that it is agnostic (insensitive) to SCR catalyst design settings. This may further allow the identification of vehicle subpopulations and allow data analytics to determine if the service performance tests on other vehicles and/or engine aftertreatment systems are applicable to a particular vehicle. The vehicles may include cars, trucks, buses etc. that operate on-road (paved or un-paved) which are subject to on-highway emission regulations. The engine aftertreatment systems may include aftertreatment systems in generator sets, farming or agricultural equipment, construction or mining equipment that operate off-road which are subject to off-highway emission regulations.

Figure 23:
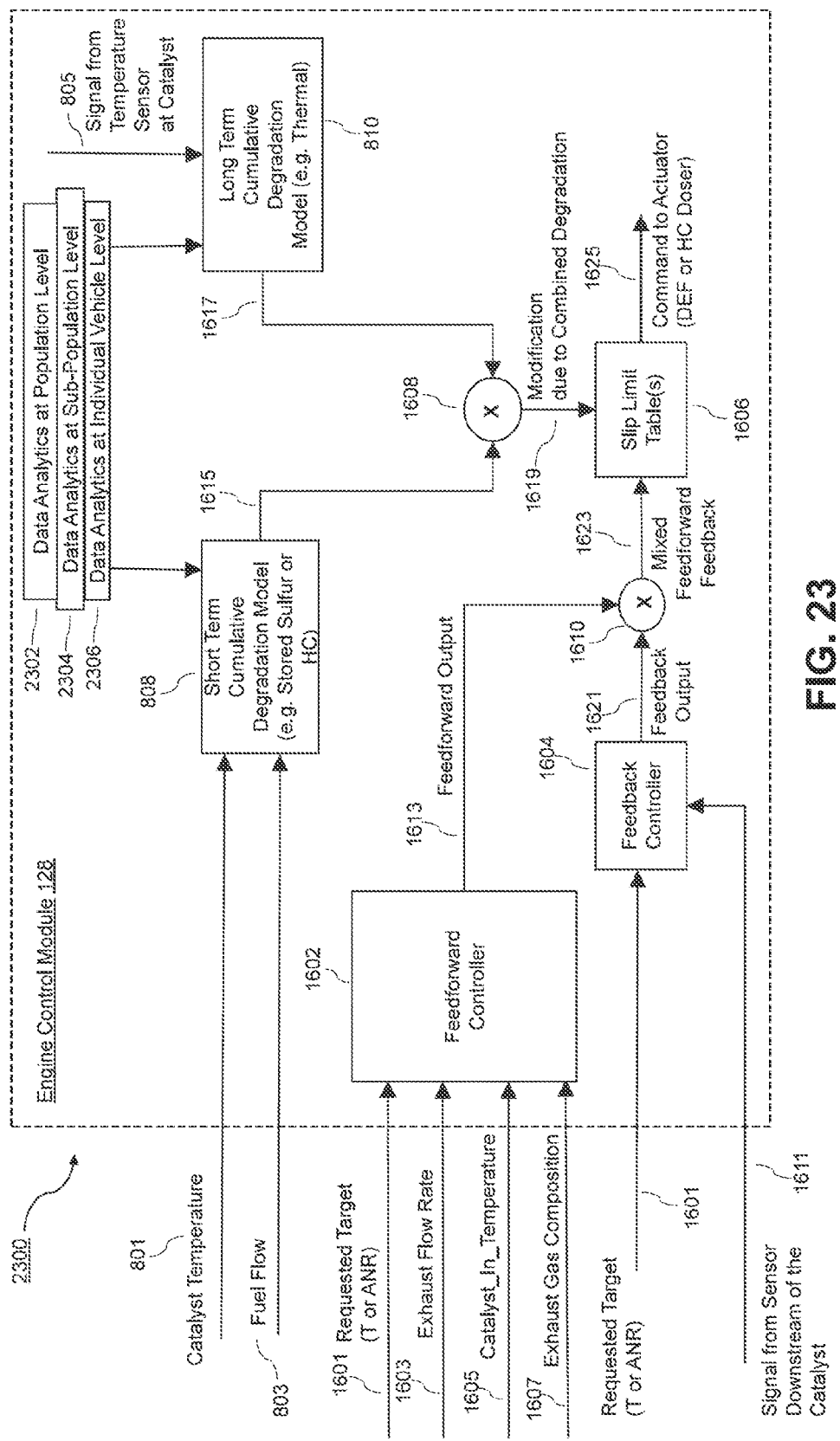
FIG. 23 illustrates an example implementation of an integration of the physics based degradation model with conventional feedforward (FF) and feedback (FB) controllers and data analytics, according to an embodiment.

FIG. 23 illustrates an example implementation 2300 of integration of data analytics with physics based degradation model combined with a conventional PID controller as shown in FIG. 16, according to an embodiment. FIG. 23 can be one example of an implementation 1600 of integrated physics based model with PID controller of FIG. 16 with additional data analytics blocks or modules. More particularly, it includes a data analytics at population level block 2302, a data analytics at sub-population level block 2304, and a data analytics at individual level block 2306 any or all of which can provide data or updates and/or parameters to the integrated cumulative damage model as shown in 1600 for future calculations. In one example, data analytics blocks 2302, 2304, and 2306 may be used for adjusting the cumulative damage model damage value on a vehicle fleet trend data and update the cumulative damage value to date as well as updating the cumulative damage model for future calculations.

In an example practical implementation, the controller 128 may be configured to receive a population SCR catalyst damage signal corresponding to an amount of SCR catalyst damage experienced by a plurality of SCR catalysts included in a respective plurality of vehicle aftertreatment systems, each of the plurality of vehicle aftertreatment systems being substantially similar to the aftertreatment system 160. Furthermore, the ECM 128 may be configured to modify the short-term cumulative degradation estimate and the long-term cumulative degradation estimate based on the population SCR catalyst damage signal. In one example, the controller 128 may receive the population SCR catalyst damage signal via a cloud network or a remote server.

Figure 24:
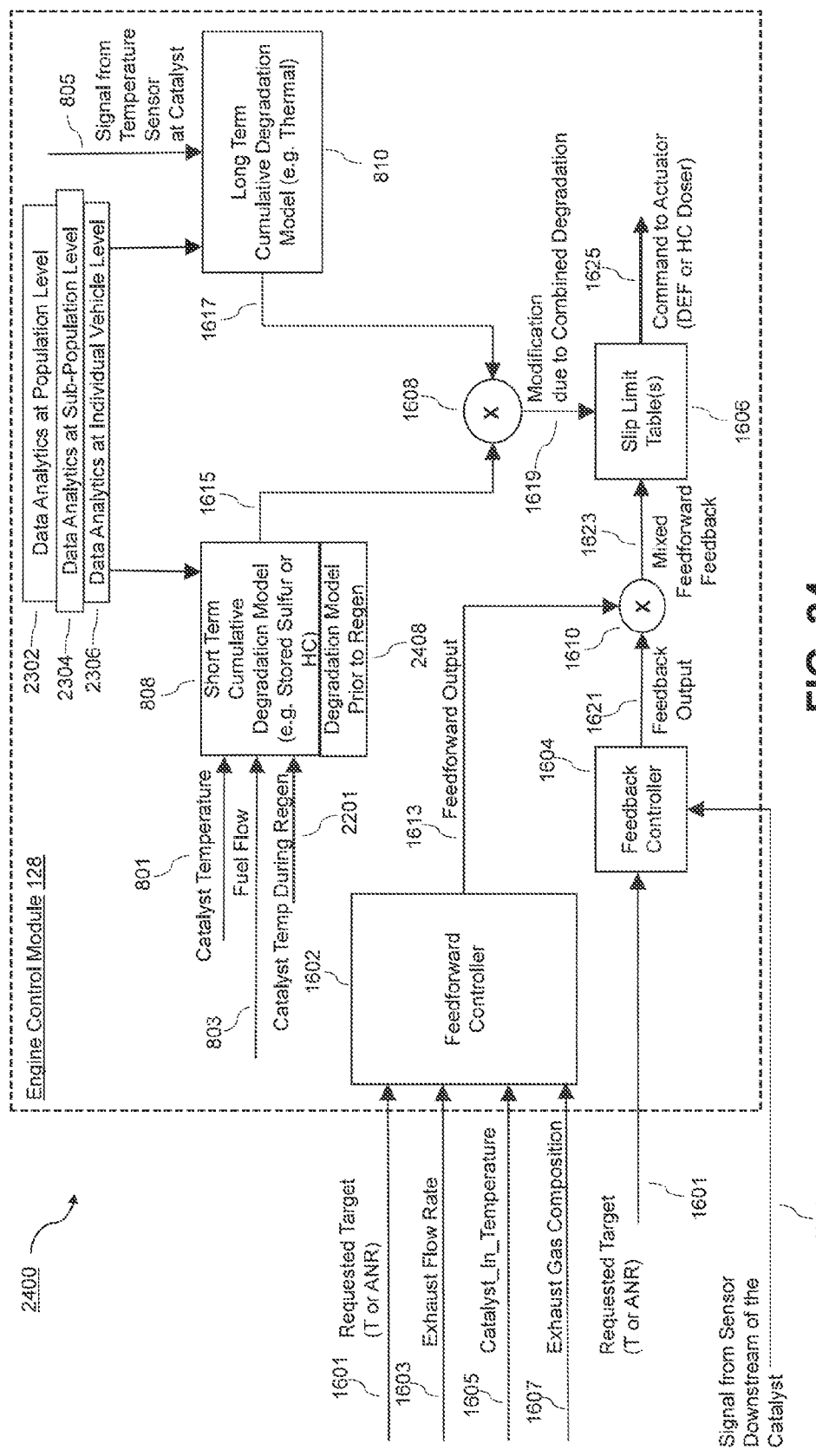
FIG. 24 illustrates another example implementation of an integration of the physics based degradation model including a degradation model prior to regeneration, according to an embodiment.

FIG. 24 illustrates another example implementation 2400 of integration of data analytics with physics based degradation model combined with a conventional PID controller as shown in FIG. 16, according to an embodiment. The implementation 2400 is similar to the implementation 2300 but includes an additional signal or parameter named SCR catalyst temperature during regeneration signal 2401 as an input to the short-term cumulative degradation model. Furthermore, there may be a degradation prior to regeneration model 2408 in this implementation.

In one example, the short-term cumulative degradation model 808 can be a sulfur exposure model to determine damage to the SCR catalyst system. A software implementation of this can include total fuel burn, SCR performance to determine the amount of sulfur exposure. If enabled, this feature may use desulfurization (i.e., sulfur removal events) as an input along with total fuel burn. An extension of this concept for the cumulative damage model may use a calculated sulfur exposure based on the total fuel burned in addition to time and temperature exposure to determine the damage to the SCR catalyst system. The software may use this information to predict SCR performance, for which measurements from field return units and telematics-based data analytics can provide feedback corrections to an individual vehicle. The use of a model-based SCR $NO_x$ conversion performance (including low temperature $NO_x$ conversion changes in short-term (10's of hours)) may allow identification of fuel sulfur exposure for an individual truck (or sub-population) based on the long-term cumulative degradation trends observed in the larger population using data analytics.

Figure 25:
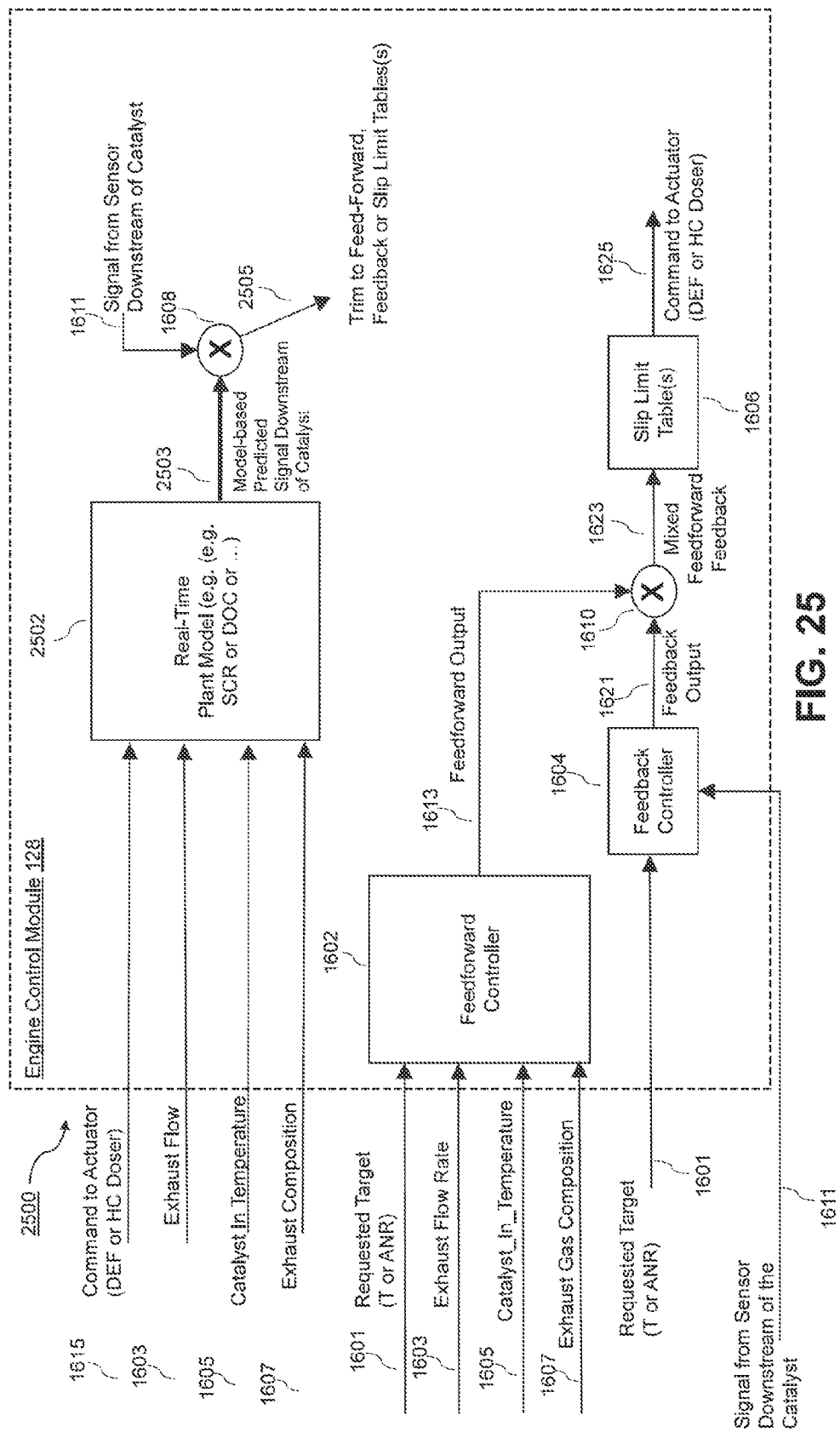
FIG. 25 illustrates an existing implementation of model-based controls in an aftertreatment system for a real time plant.

FIG. 25 illustrates an existing implementation 2500 of model-based controls in an aftertreatment system for a real time plant. As shown, FIG. 25 includes a real-time plant model 2502 is configured to output a signal 2503, which is a model-based signal downstream of SCR catalyst. That signal can be mixed with the signal from a sensor downstream of SCR catalyst by the first signal mixer 1608. An output signal 2505 can then be provided to the FF controller 1602 or the FB controller 1604 or the slip-limit tables block 1606.

Figure 26:
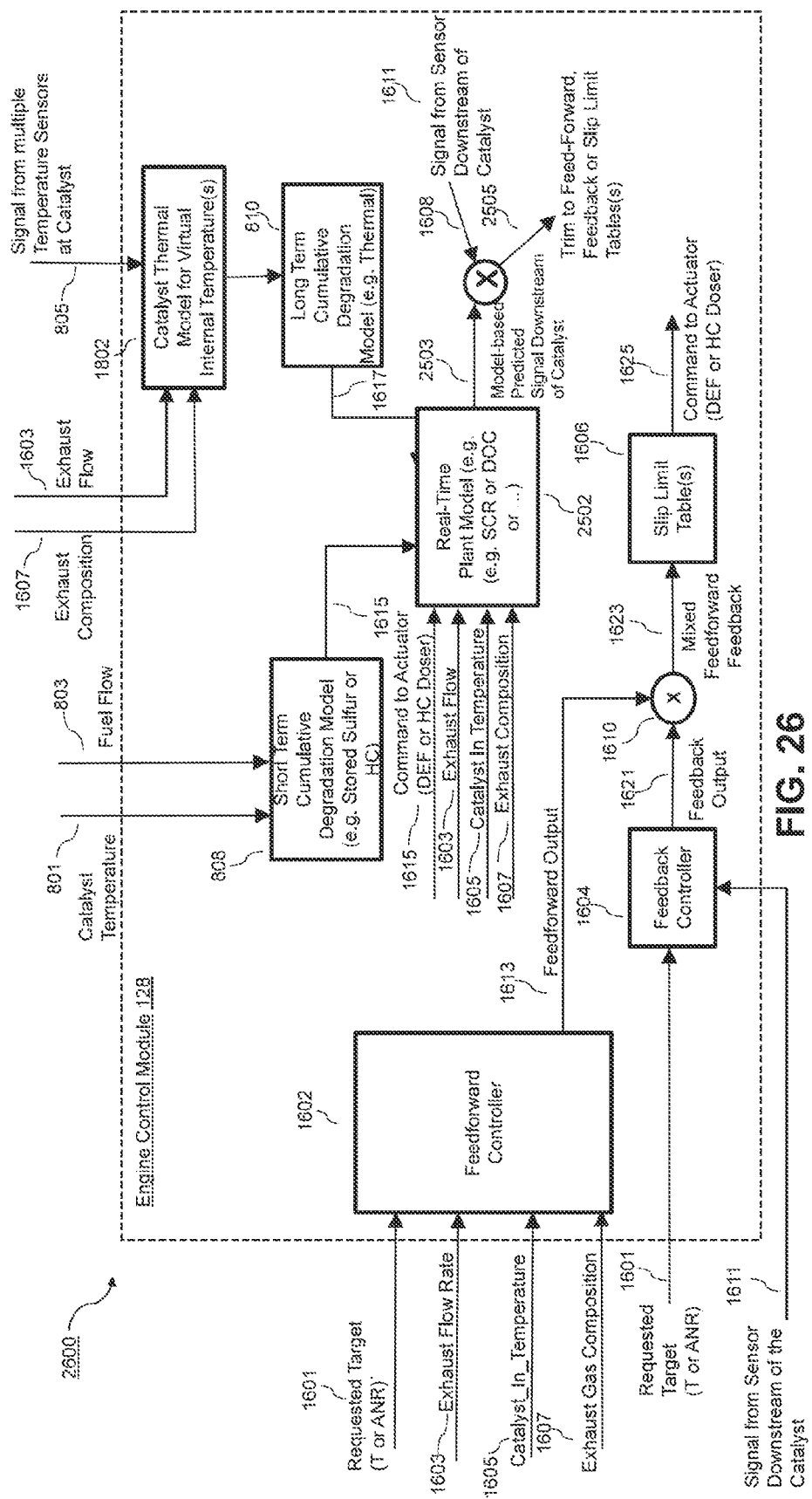
FIG. 26 illustrates an example implementation of integration of the cumulative damage based model in the implementation of FIG. 25, according to an embodiment.

FIG. 26 illustrates an example implementation 2600 of integration of the physics based degradation model with the real-time plant model 2502, according to an embodiment. The implementation 2600 is a combination of the implementation 2500 and 1800. The damage events within SCR catalyst systems are a function of the internal SCR catalyst bed temperatures and the use of a SCR catalyst thermal model for virtual internal temperature sensors combined with physics-based embedded damage models can improve the ability of the control system to track cumulative damage over time. Due to the cylindrical form of SCR catalyst elements, the virtual internal temperature sensors can be simplified to two-dimensional (radial and axial) models and the embedded cumulative damage model can be applied within radial and axial zones of the cylindrical SCR catalyst element. The overall cumulative damage within the SCR catalyst bed is an aggregate of the local cumulative damage within radial/axial zone.

Figure 27:
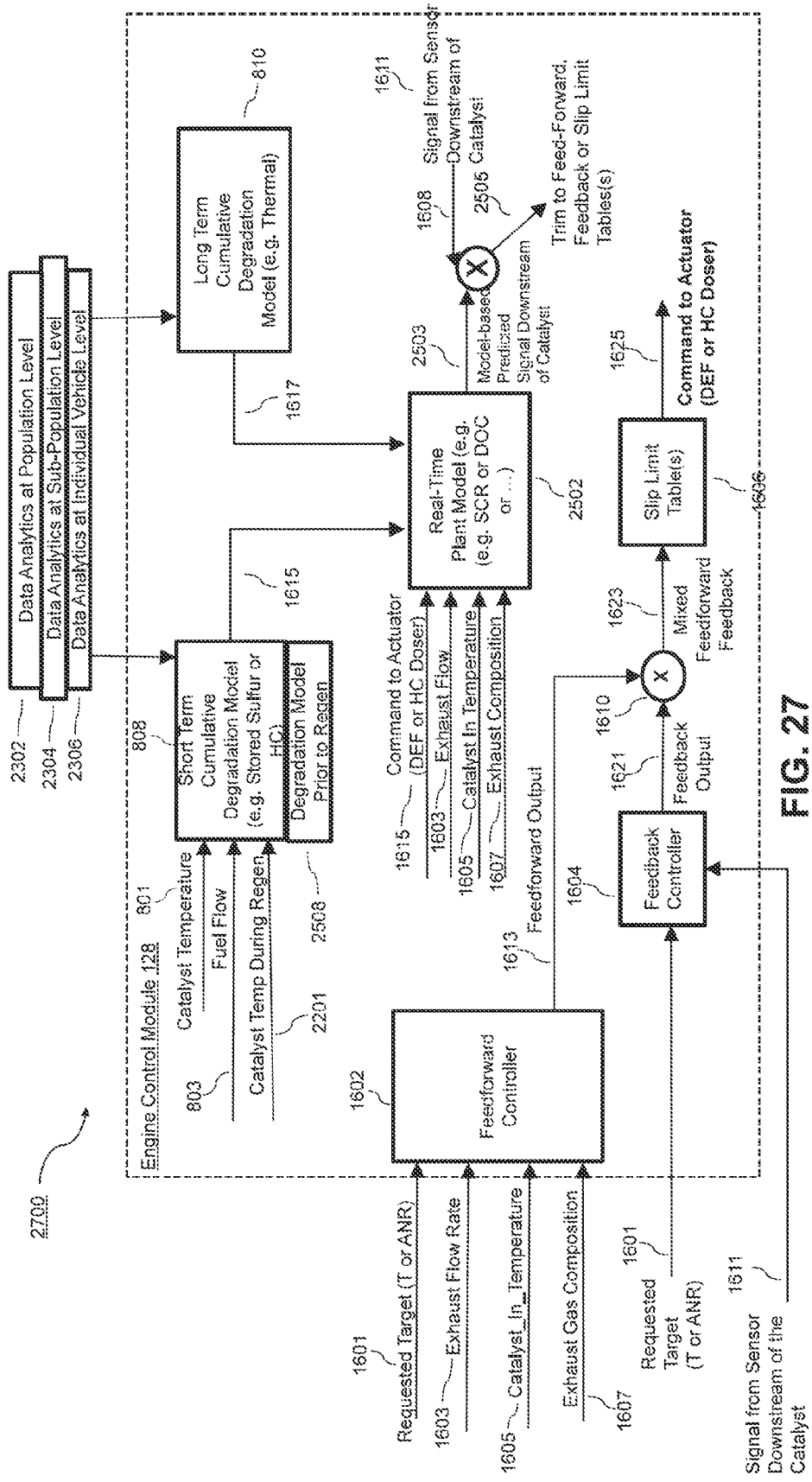
FIG. 27 illustrates an example implementation of integration of data analytics with the real time plant model and physics based degradation model and a conventional PID controller, according to an embodiment.

FIG. 27 illustrates an example implementation 2700 of integration of data analytics with a real time plant model and physics based degradation models (808 and 810) and a conventional PID controller, according to an embodiment. The implementation 2700 is a combination of the implementation 2600 and 2300. As can be seen, the data analytics blocks 2302, 2304, and 2306 are provided to the short-term and long-term cumulative degradation models 808 and 810 respectively, the outputs of which are further given as an input to the real-time plant model 2502. In one example, machine learning is also used along with the data analytics blocks. This implementation allows the model-based controls also referred to as digital twin controls, the cumulative damage models 808 and 810 to operate on different time scales. For example, the model-based controls can operate on a time scale of milliseconds, while the short-term model 808 and long-term model 810 or a real time plant model which will be shown later in the specification, can operate on a time scale of hours, and the data analytics to run on a time scale of weeks or months.

It should be noted with respect to all of the above embodiments that the physics based degradation model or a cumulative damage model is configured to extract, store, and organize various types of data including but not limited to SCR catalyst temperature, fuel flow, exhaust flow rate, exhaust composition, target SCR catalyst temperature, ammonia to $NO_x$ ratio from various types of sensors included in an aftertreatment system of a single of a plurality of vehicles. Furthermore, the physics based degradation model is configured to extract, store, and organize data related to degradation factor, duty cycle, drive cycle, load factors, other performance indicators for early life, mid-life, and end of life for a single vehicle or a plurality of vehicles. Furthermore, the disclosed physics based degradation model is configured to extract, store, and organize $NO_x$ reduction data related to various aftertreatment system regimes. Any or all of this can be extracted, collected, stored, and/or organized using data analytics or cloud based systems or on-board analytics or hardware or software or machine learning or artificial intelligence, or any combination thereof.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The term "catalyst" may be used to mean "SCR catalyst" in this specification.

The term "short-term cumulative degradation model" may be used to alternatively with the term "short-term model" in this specification.

The term "long-term cumulative degradation model" may be used to alternatively with the term "long-term model" in this specification.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller for controlling operation of an aftertreatment system configured to treat constituents of an exhaust gas produced by an engine, the aftertreatment system including a selective catalytic reduction (SCR) catalyst, the controller configured to:
generate a short-term cumulative degradation estimate of the SCR catalyst corresponding to reversible degradation of the SCR catalyst due to sulfur and/or hydrocarbons based on a SCR catalyst temperature parameter;
generate a long-term cumulative degradation estimate of the SCR catalyst corresponding to thermal aging of the SCR catalyst based on the SCR catalyst temperature parameter;
generate a combined degradation estimate of the SCR catalyst based on the short-term cumulative degradation estimate and the long-term cumulative degradation estimate; and
adjust an amount of reductant and/or an amount of hydrocarbons inserted into the aftertreatment system based on the combined degradation estimate.

2. The controller of claim 1, wherein:
the SCR catalyst temperature parameter comprises an inlet exhaust gas temperature at an inlet of the SCR catalyst, an outlet exhaust gas temperature at an outlet of the SCR catalyst, or a SCR catalyst temperature of the SCR catalyst.

3. The controller of claim 2, wherein the SCR catalyst temperature parameter is determined using a physical temperature sensor.

4. The controller of claim 2, wherein the SCR catalyst temperature is calculated based on operating parameters of the exhaust gas.

5. The controller of claim 1, further configured to:
modify stored ammonia slip data corresponding to ammonia slip through the SCR catalyst relative to a SCR catalyst temperature based on at least the combined degradation estimate, and
adjust the amount of reductant and/or the amount of hydrocarbons inserted into the aftertreatment system based on the modified stored ammonia slip data.

6. The controller of claim 1, further configured to:
modify stored hydrocarbon slip data corresponding to hydrocarbon slip through the DOC catalyst relative to a DOC catalyst temperature based on at least the combined degradation estimate, and
adjust the amount of hydrocarbons inserted into the aftertreatment system based on the modified stored hydrocarbon slip data.

7. The controller of claim 6, wherein the controller is further configured to:
modify the stored ammonia slip data in response to:
a target value of a SCR catalyst temperature of the SCR catalyst or an ammonia to $NO_x$ ratio,
an exhaust flow rate,
a SCR catalyst inlet temperature at an inlet of the SCR catalyst, and
an exhaust gas composition of the exhaust gas.

8. The controller of claim 1, further configured to:
receive a population SCR catalyst damage signal corresponding to an amount of SCR catalyst damage experienced by a plurality of vehicle SCR catalysts included in a respective plurality of vehicle aftertreatment systems, each of the plurality of vehicle aftertreatment systems being substantially similar to the aftertreatment system, and
modify the short-term cumulative degradation estimate and the long-term cumulative degradation estimate based on the signal.

9. The controller of claim 8, wherein the population SCR catalyst damage signal is received by the controller via a cloud network or a remote server.

10. The controller of claim 1, wherein the controller is operably coupled to a telematics system.

11. The controller of claim 10, further configured to:
determine an aging value of the SCR catalyst based on the combined degradation estimate of the SCR catalyst, and transmit the aging value of the SCR catalyst to the telematics system for setting a preventive maintenance alert.

12. A method for a controller for controlling operation of an aftertreatment system configured to treat constituents of an exhaust gas produced by an engine, the aftertreatment system including a selective catalytic reduction (SCR) SCR catalyst or a diesel oxidation catalyst, the method comprising:
generating a short-term cumulative degradation estimate of the SCR catalyst corresponding to reversible degradation of the SCR catalyst due to sulfur and/or hydrocarbons based on a SCR catalyst temperature parameter;
generating a long-term cumulative degradation estimate of the SCR catalyst corresponding to thermal aging of the SCR catalyst based on the SCR catalyst temperature parameter,
generating a combined degradation estimate of the SCR catalyst based on the short-term cumulative degradation estimate and the long-term cumulative degradation estimate; and
adjusting an amount of reductant and/or an amount of hydrocarbons inserted into the aftertreatment system based on the combined degradation estimate.

13. The method of claim 12, wherein:
the SCR catalyst temperature parameter comprises an inlet exhaust gas temperature at an inlet of the SCR catalyst, an outlet exhaust gas temperature at an outlet of the SCR catalyst, or a SCR catalyst temperature of the SCR catalyst.

14. The method of claim 13, wherein the SCR catalyst temperature parameter is determined using a physical temperature sensor.

15. The method of claim 13, wherein the SCR catalyst temperature parameter is calculated based on operating parameters of the exhaust gas.

16. The method of claim 12, comprising:
modifying stored ammonia slip data corresponding to ammonia slip through the SCR catalyst relative to a SCR catalyst temperature based on at least the combined degradation estimate, and
adjusting the amount of reductant and/or the amount of hydrocarbons inserted into the aftertreatment system based on the modified stored ammonia slip data.

17. The method of claim 12, further comprising:
modifying stored hydrocarbon slip data corresponding to hydrocarbon slip through the DOC catalyst relative to a DOC catalyst temperature based on at least the combined degradation estimate, and
adjusting the amount of reductant and/or the amount of hydrocarbons inserted into the aftertreatment system based on the modified stored hydrocarbon slip data.

18. The method of claim 16, comprising:
modifying the stored ammonia slip data in response to:
a target value of a SCR catalyst temperature of the SCR catalyst or an ammonia to $NO_x$ ratio,
an exhaust flow rate,
a SCR catalyst inlet temperature at an inlet of the SCR catalyst, and
an exhaust gas composition of the exhaust gas.

19. The method of claim 12, comprising:
receiving a population SCR catalyst damage signal corresponding to an amount of SCR catalyst damage experienced by a plurality of vehicle SCR catalysts included in a respective plurality of vehicle aftertreatment systems, each of the plurality of vehicle aftertreatment systems being substantially similar to the aftertreatment system, and
modifying the short-term cumulative degradation estimate and the long-term cumulative degradation estimate based on the signal.

20. The method of claim 19, comprising:
receiving the population SCR catalyst damage signal by the controller via a cloud network or a remote server.

21. The method of claim 12, wherein the controller is operably coupled to a telematics system.

22. The method of claim 12, further comprising:
determining an aging value of the SCR catalyst based on the combined degradation estimate of the SCR catalyst, and
transmitting the aging value of the SCR catalyst to the telematics system for setting a preventive maintenance alert.

* * * * *